US012707422B2

(12) United States Patent
Kumar et al.

(10) Patent No.: US 12,707,422 B2
(45) Date of Patent: Aug. 11, 2026

(54) USING QUASI-COLOCATION RELATIONSHIPS FOR NEIGHBORING CELLS IN POSITIONING

(71) Applicant: QUALCOMM Incorporated, San Diego, CA (US)

(72) Inventors: Akash Kumar, Hyderabad (IN); Alexandros Manolakos, Athens (GR)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/576,298

(22) PCT Filed: Jun. 30, 2022

(86) PCT No.: PCT/US2022/073320
§ 371 (c)(1),
(2) Date: Jan. 3, 2024

(87) PCT Pub. No.: WO2023/028391
PCT Pub. Date: Mar. 2, 2023

(65) Prior Publication Data

US 2024/0314726 A1 Sep. 19, 2024

(30) Foreign Application Priority Data

Aug. 23, 2021 (GR) ............................ 202010100565

(51) Int. Cl.
*H04W 64/00* (2009.01)
*H04W 48/08* (2009.01)

(52) U.S. Cl.
CPC .......... *H04W 64/00* (2013.01); *H04W 48/08* (2013.01)

(58) Field of Classification Search
CPC ..... H04W 64/00; H04W 48/08; H04W 48/10; H04W 48/12; H04W 24/08; H04W 24/10; H04B 7/06968; H04L 5/0048
See application file for complete search history.

(56) References Cited

U.S. PATENT DOCUMENTS

2020/0264261 A1 8/2020 Akkarakaran et al.
2020/0374749 A1* 11/2020 Zhang .................. H04W 72/23
(Continued)

FOREIGN PATENT DOCUMENTS

EP 3836689 A1 6/2021
WO 2021029960 A1 2/2021

OTHER PUBLICATIONS

3GPP TS 36.355: "3rd Generation Partnership Project, Technical Specification Group Radio Access Network, Evolved Universal Terrestrial Radio Access (E-UTRA), LTE Positioning Protocol (LPP) (Release 15)", 3GPP Standard, Mobile Competence Centre, 650, Route Des Lucioles, F-06921 Sophia-Antipolis Cedex, France, vol. RAN WG2, No. V15.5.0, Sep. 30, 2019, pp. 1-224, XP051785102, Clauses 4.3.5-5.5.3, pp. 28, 49-50, 15, 53, 21-23, 75-76.
(Continued)

*Primary Examiner* — John J Lee
(74) *Attorney, Agent, or Firm* — Muncy, Geissler, Olds & Lowe, P.C./ QUALCOMM Incorporated

(57) ABSTRACT

Disclosed are techniques for wireless communication. In an aspect, a user equipment (UE) may receive system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells. The UE may report, to a location server, identifiers of one or more neighboring cells of the plurality of neighboring cells, the
(Continued)

one or more neighboring cells selected from individual neighboring cells in one or more individual sets of neighboring cells of the plurality of neighboring cells, wherein the individual neighboring cells in each individual set of neighboring cells have a common QCL relationship with other individual neighboring cells in the individual set of neighboring cells.

20 Claims, 21 Drawing Sheets

(56) References Cited

U.S. PATENT DOCUMENTS

| | | | | |
|---|---|---|---|---|
| 2021/0051623 | A1* | 2/2021 | Manolakos | G01S 5/0236 |
| 2021/0160706 | A1 | 5/2021 | Wu et al. | |
| 2021/0176748 | A1* | 6/2021 | Wu | H04W 74/0808 |

OTHER PUBLICATIONS

International Search Report and Written Opinion—PCT/US2022/073320—ISA/EPO—Dec. 16, 2022.

Partial International Search Report—PCT/US2022/073320—ISA/EPO—Oct. 24, 2022.

Qualcomm Incorporated: "Summary of LPP Corrections Agenda Item 6.6.3", 3GPP TSG-RAN WG2 Meeting #112-e, R2-2010975, 3rd Generation Partnership Project, Mobile Competence Centre, 650, Route Des Lucioles, F-06921 Sophia-Antipolis Cedex, France, vol. RAN WG2, No. Electronic, Nov. 2, 2020-Nov. 13, 2020, Oct. 30, 2020, 5 Pages, XP051948577, Sections 2-3.4, the whole document.

* cited by examiner

100
Location Server
172
Core Network
170
mmW BS
180
UE
182
184
122
128
134
BS
102
UE
104
120
UE
164
110
192
UE
190
194
STA
152
154
AP
150
UE
152
SC
102'
110'
SV
112
124

QCL Types Legend

| QCL type | Relationship |
|---|---|
| Type A | Doppler shift, Doppler spread, average delay, delay spread |
| Type B | Doppler shift, Doppler spread |
| Type C | Doppler shift, average delay |
| Type D | Spatial receive parameters |

902

Receive system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells

904

Report, to a location server, identifiers of one or more neighboring cells of the plurality of neighboring cells, the one or more neighboring cells selected from individual neighboring cells in one or more individual sets of neighboring cells of the plurality of neighboring cells, wherein the individual neighboring cells in each individual set of neighboring cells have a common QCL relationship with other individual neighboring cells in the individual set of neighboring cells

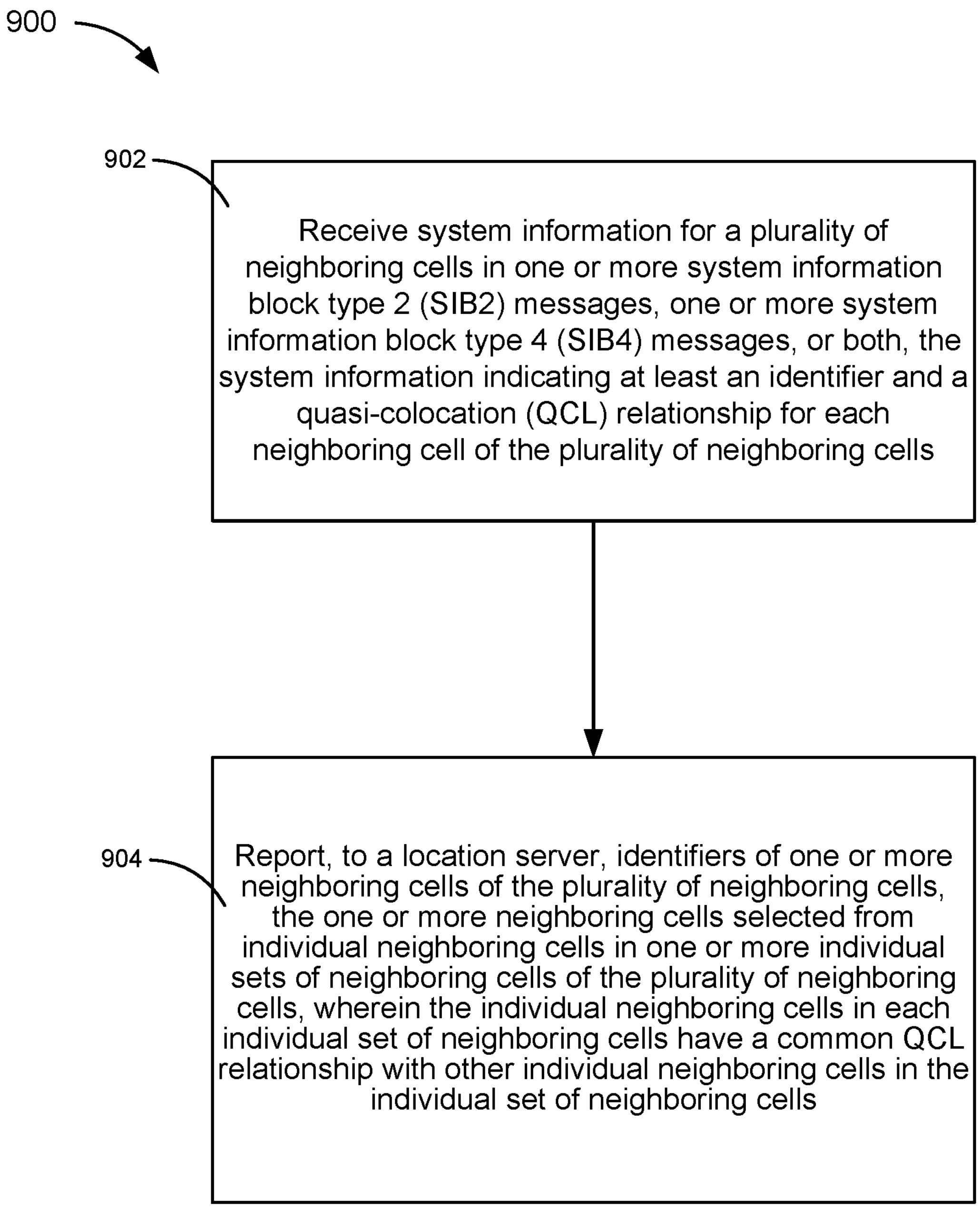

| No QCL Cell Set |
|---|
| PCI4/SSB4 |
| PCI5/SSB5 |
| PCI10/SSB2 |
| PCI11/SSB11 |
| PCI14/SSB14 |
| PCI19/SSB19 |
| PCI20/SSB20 |

1204

| Cell Set 1 (Common QCL) | |
|---|---|
| Cell | RSI Rank within Cell Set1 |
| PCI1/SSB1 | 3 |
| PCI2/SSB2 | 1 |
| PCI3/SSB3 | 2 |

1206

| Cell Set 2 (Common QCL) | |
|---|---|
| Cell | RSI Rank within Cell Set 2 |
| PCI6/SSB6 | 2 |
| PCI7/SSB7 | 4 |
| PCI8/SSB8 | 3 |
| PCI9/SSB9 | 1 |

1208

| Cell Set 3 (Common QCL) | |
|---|---|
| Cell | RSI Rank within Cell Set 3 |
| PCI12/SSB12 | 1 |
| PCI13/SSB13 | 2 |

1210

| Cell Set 4 (Common QCL) | |
|---|---|
| Cell | RSI Rank within Cell Set 4 |
| PCI15/SSB15 | 1 |
| PCI16/SSB16 | 2 |

1212

| Cell Set 5 (Common QCL) | |
|---|---|
| Cell | RSI Rank within Cell Set 5 |
| PCI17/SSB17 | 2 |
| PCI18/SSB18 | 1 |

| Neighboring Cell Identifiers Reported to the Location Server |
| --- |
| PCI4/SSB4 |
| PCI5/SSB5 |
| PCI10/SSB10 |
| PCI13/SSB11 |
| PCI14/SSB14 |
| PCI19/SSB19 |
| PCI20/SSB20 |
| PCI2/SSB2 |
| PCI9/SSB9 |
| PCI11/SSB13 |
| PCI15/SSB15 |
| PCI18/SSB18 |

| Ordered Measurement of Cells For Assistance Data | |
|---|---|
| **Cell** | **Round Robin Cycle** |
| PCI4/SSB4 | N/A |
| PCI5/SSB5 | |
| PCI10/SSB10 | |
| PCI13/SSB11 | |
| PCI14/SSB14 | |
| PCI19/SSB19 | |
| PCI20/SSB20 | |
| PCI2/SSB2 | Cycle 1 |
| PCI9/SSB9 | |
| PCI12/SSB12 | |
| PCI15/SSB15 | |
| PCI3/SSB3 | |
| PCI6/SSB6 | Cycle 2 |
| PCI13/SSB13 | |
| PCI16/SSB16 | |
| PCI17/SSB17 | |
| PCI1/SSB1 | Cycle 3 |
| PCI8/SSB8 | |
| PCI9/SSB9 | Cycle 4 |

Receive system information for a plurality of neighboring cells, the system information indicating at least an identifier and a quasi-colocation (QCL) relation for each neighboring cell of the plurality of neighboring cells

1704

Select a subset of neighboring cells from individual neighboring cells of each individual set of one or more individual sets of neighboring cells for providing first assistance data to a UE, wherein the individual neighboring cells in each individual set of neighboring cells have a common QCL relationship with other individual neighboring cells in the individual set of neighboring cells, the subset of neighboring cells having fewer individual neighboring cells than the individual set of neighboring cells from which the subset of neighboring cells is selected

1706

Transmit the first assistance data to the UE, the first assistance data including identifiers of one or more of the individual neighboring cells in each subset of neighboring cells

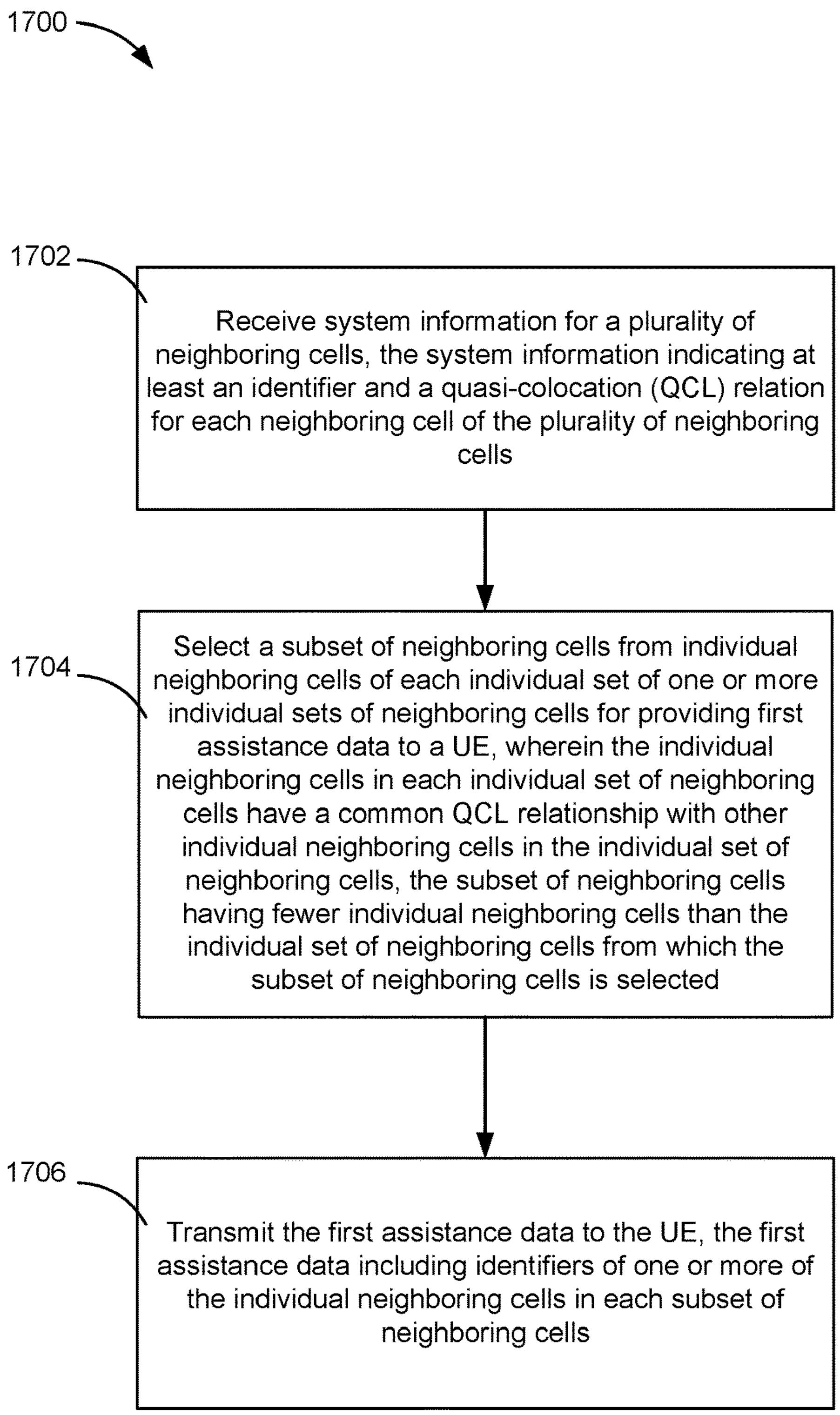

| Neighboring Cell Identifiers Transmitted to the UE For Assistance Data |
|---|
| PCI4/SSB4 |
| PCI5/SSB5 |
| PCI10/SSB10 |
| PCI13/SSB13 |
| PCI14/SSB14 |
| PCI19/SSB19 |
| PCI20/SSB20 |
| PCI2/SSB2 |
| PCI9/SSB9 |
| PCI11/SSB11 |
| PCI15/SSB15 |
| PCI18/SSB18 |

*FIG. 18*

USING QUASI-COLOCATION RELATIONSHIPS FOR NEIGHBORING CELLS IN POSITIONING

CROSS-REFERENCE TO RELATED APPLICATIONS

The present Application for Patent claims priority to Greek Patent Application No. 20210100565, entitled "USING QUASI-COLOCATION RELATIONSHIPS FOR NEIGHBORING CELLS IN POSITIONING," filed Aug. 23, 2021, and is a national stage application, filed under 35 U.S.C. § 371, of International Patent Application No. PCT/US2022/073320, entitled "USING QUASI-COLOCATION RELATIONSHIPS FOR NEIGHBORING CELLS IN POSITIONING," filed Jun. 30, 2022, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and reporting, to a location server, identifiers of one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

In an aspect, a method of wireless communication performed by a user equipment (UE) includes receiving assistance data from a location server, the assistance data identifying a plurality of neighboring cells for a positioning session; receiving system information for the plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and measuring reference signals from one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

In an aspect, a method of operating a location server (LS) includes receiving system information for a plurality of neighboring cells, the system information indicating at least an identifier and a quasi-colocation (QCL) relation for each neighboring cell of the plurality of neighboring cells; and selecting a subset of neighboring cells from each individual set of one or more individual sets of neighboring cells for providing first assistance data to a UE, wherein the individual neighboring cells in each individual set of neighboring cells have a common QCL relationship with other individual neighboring cells in the individual set of neighboring cells, the subset of neighboring cells having fewer individual neighboring cells than the individual set of neighboring cells from which the subset of neighboring cells is selected; and transmitting the first assistance data to the UE, the first assistance data including identifiers of one or more of the individual neighboring cells in each subset of neighboring cells.

In an aspect, a user equipment (UE) includes a memory; at least one transceiver; and at least one processor communicatively coupled to the memory and the at least one transceiver, the at least one processor configured to: receive, via the at least one transceiver, system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and report, to a location server via the at least one transceiver, identifiers of one or more neighboring cells of the plurality of neighboring cells, the one or more neighboring cells selected from individual neighboring cells of one or more individual sets of neighboring cells of the plurality of neighboring cells, wherein each individual neighboring cell in each individual set of neighboring cells have a common QCL relationship with other individual neighboring cells in the individual set of neighboring cells.

In an aspect, a user equipment (UE) includes a memory; at least one transceiver; and at least one processor communicatively coupled to the memory and the at least one transceiver, the at least one processor configured to: receive, via the at least one transceiver, assistance data from a location server, the assistance data identifying a plurality of neighboring cells for a positioning session; receive, via the at least one transceiver, system information for the plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and measure, via the at least one transceiver, reference signals from one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

In an aspect, a location server includes a memory; at least one transceiver; and at least one processor communicatively coupled to the memory and the at least one transceiver, the at least one processor configured to: receive, via the at least one transceiver, system information for a plurality of neighboring cells, the system information indicating at least an identifier and a quasi-colocation (QCL) relation for each neighboring cell of the plurality of neighboring cells; and select a subset of neighboring cells from each individual set of one or more individual sets of neighboring cells for providing first assistance data to a user equipment (UE), wherein the individual neighboring cells in each individual set of neighboring cells have a common QCL relationship with other neighboring cells in the individual set of neighboring cells, the subset of neighboring cells having fewer neighboring cells than the individual set of the one or more neighboring cells from which the subset of neighboring cells is selected; and transmit, via the at least one transceiver, the first assistance data to the UE, the first assistance data including identifiers of one or more of the individual neighboring cells in each subset of neighboring cells.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 9 is a flowchart depicting operations of an example method of wireless communication performed by a UE according to aspects of the disclosure.

FIG. 12 shows an example manner in which the UE processes the system information for QCL relationships according to aspects of the disclosure.

FIG. 13 shows one example of a set of neighboring cells that are reported by the UE to the location server for inclusion in assistance data (AD) according to aspects of the disclosure.

FIG. 16 shows a table depicting an example series of ordered neighboring cell measurements that may be undertaken by a UE according to aspects of the disclosure.

FIG. 17 is a flowchart depicting operations of an example method of wireless communication performed by a location server according to aspects of the disclosure.

FIG. 18 is a table showing an example set of neighboring cells included in AD transmitted by a location server according to aspects of the disclosure.

DETAILED DESCRIPTION

Figure 1:
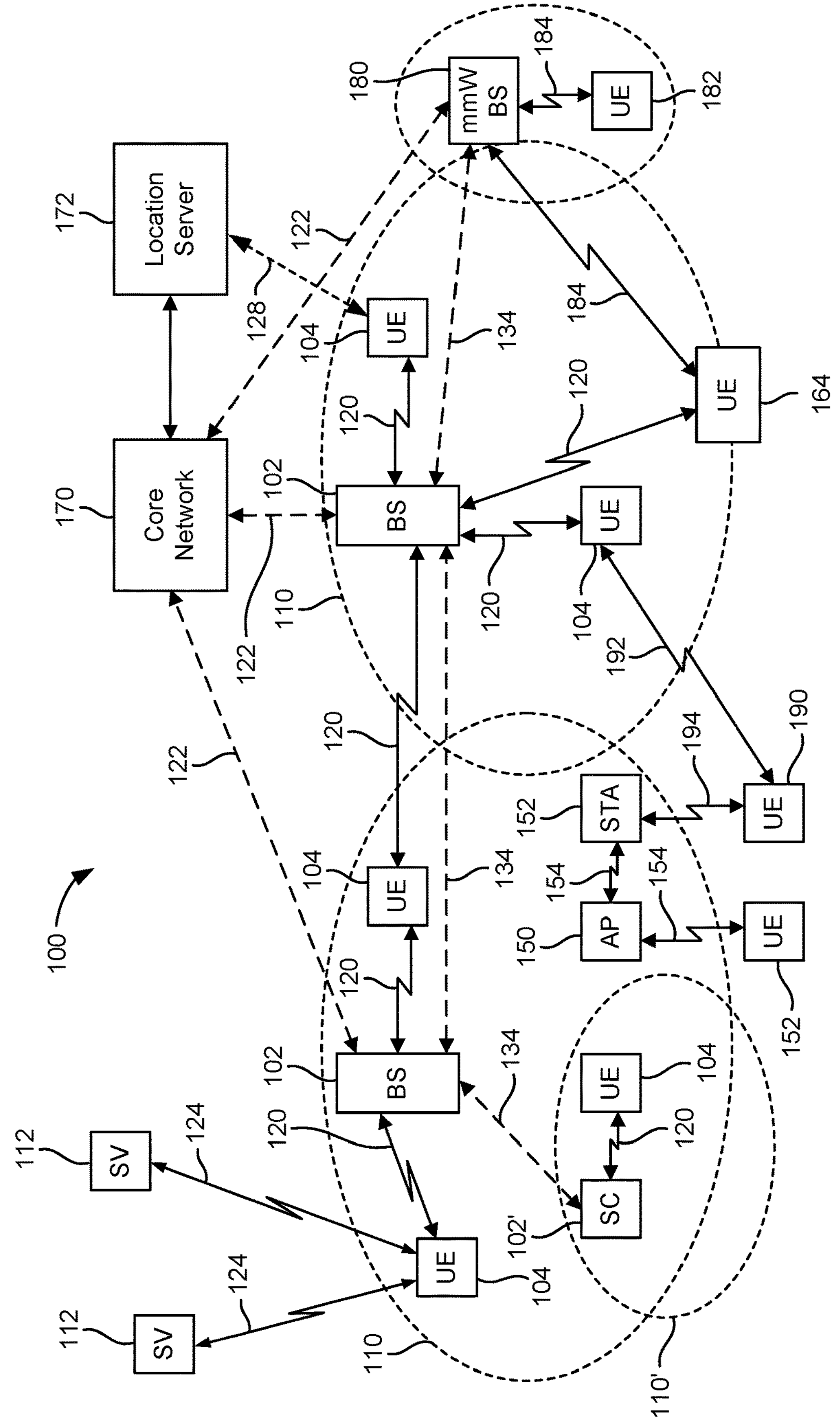
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio-frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multi-path channels. The same transmitted RF signal on different paths between the transmitter and receiver may be referred to as a "multi-path" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio-frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., Reference Signal Received Power (RSRP), Reference Signal Received Quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example, an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
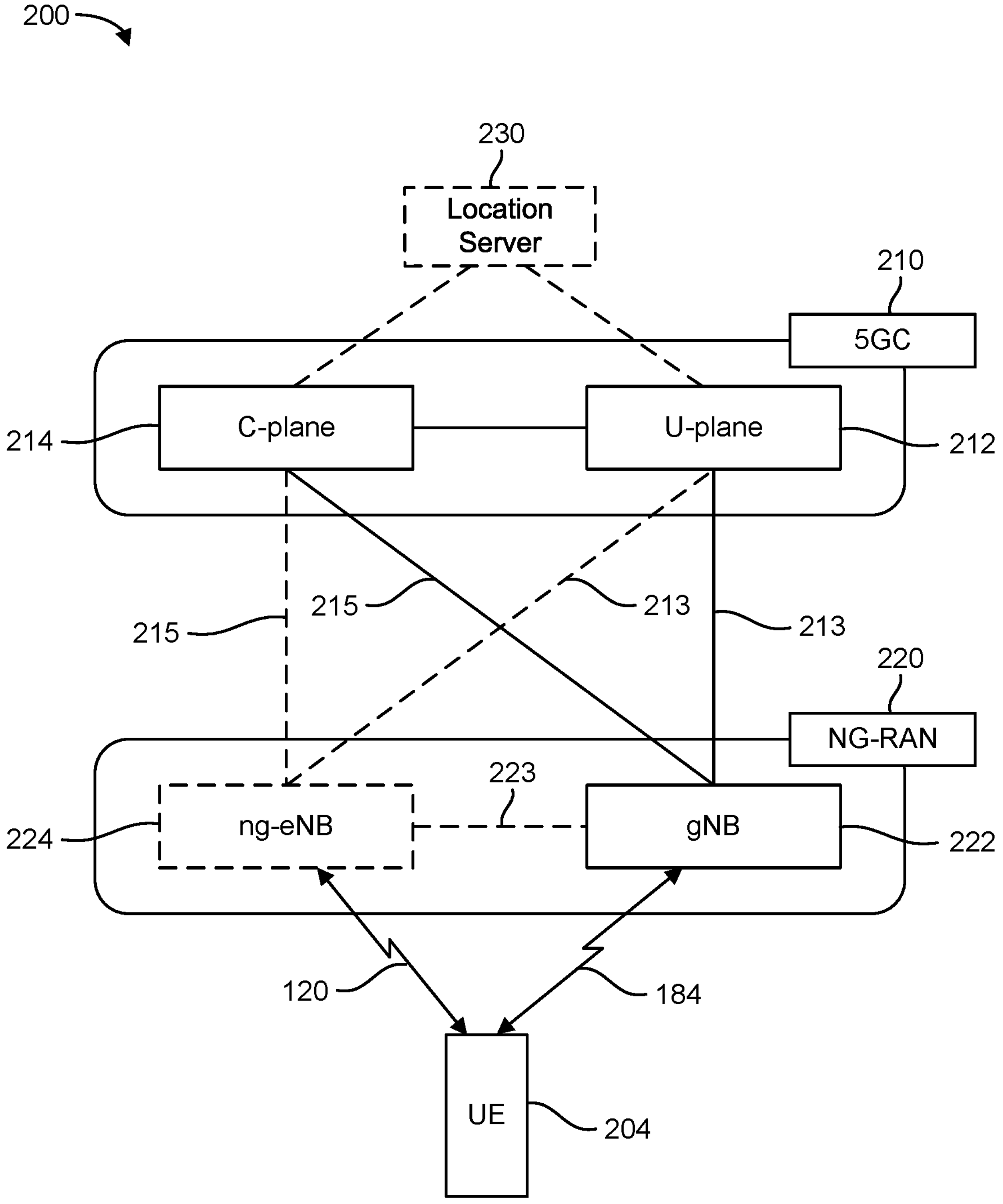
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, Internet Protocol (IP) routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
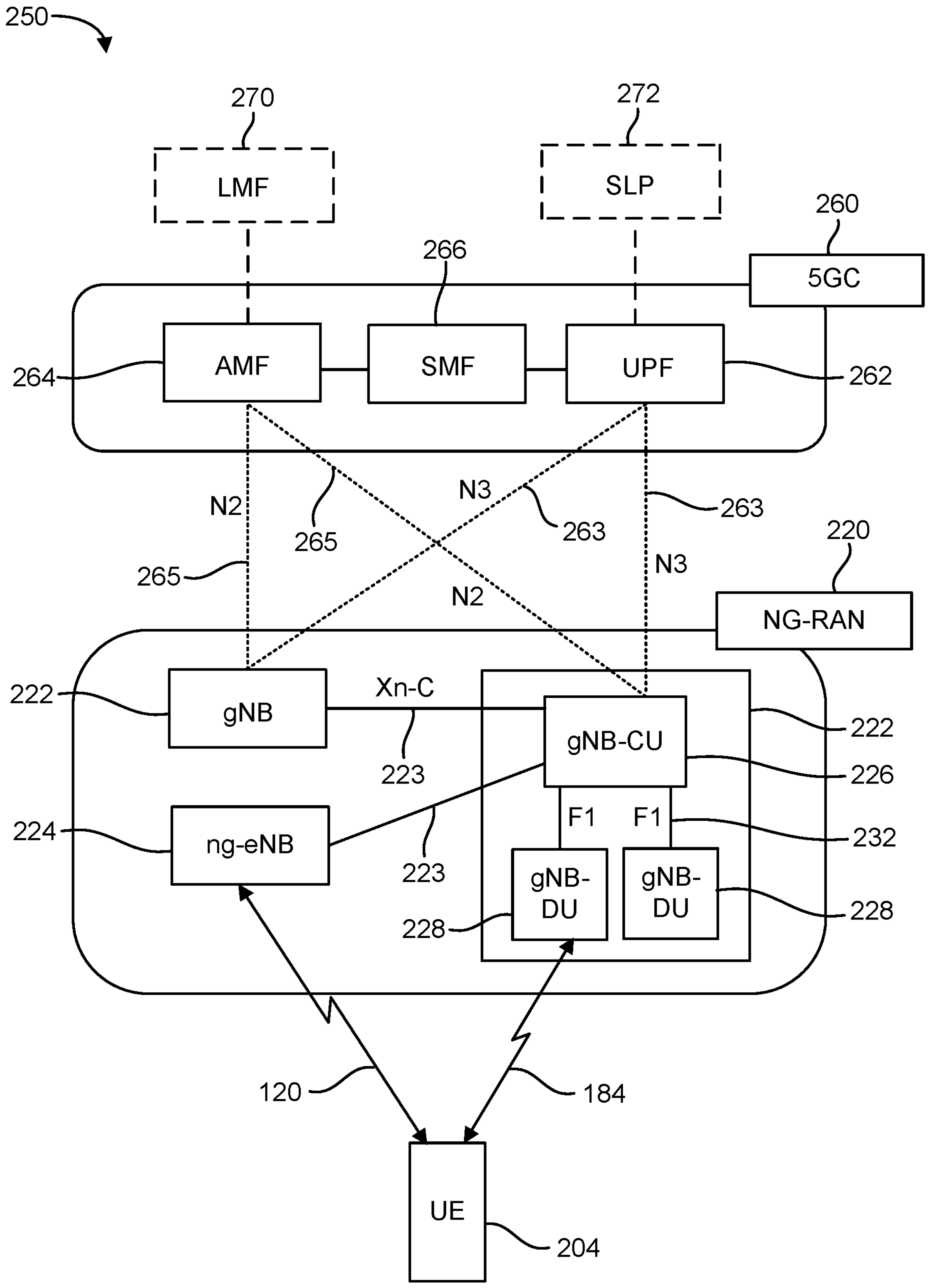

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet Protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
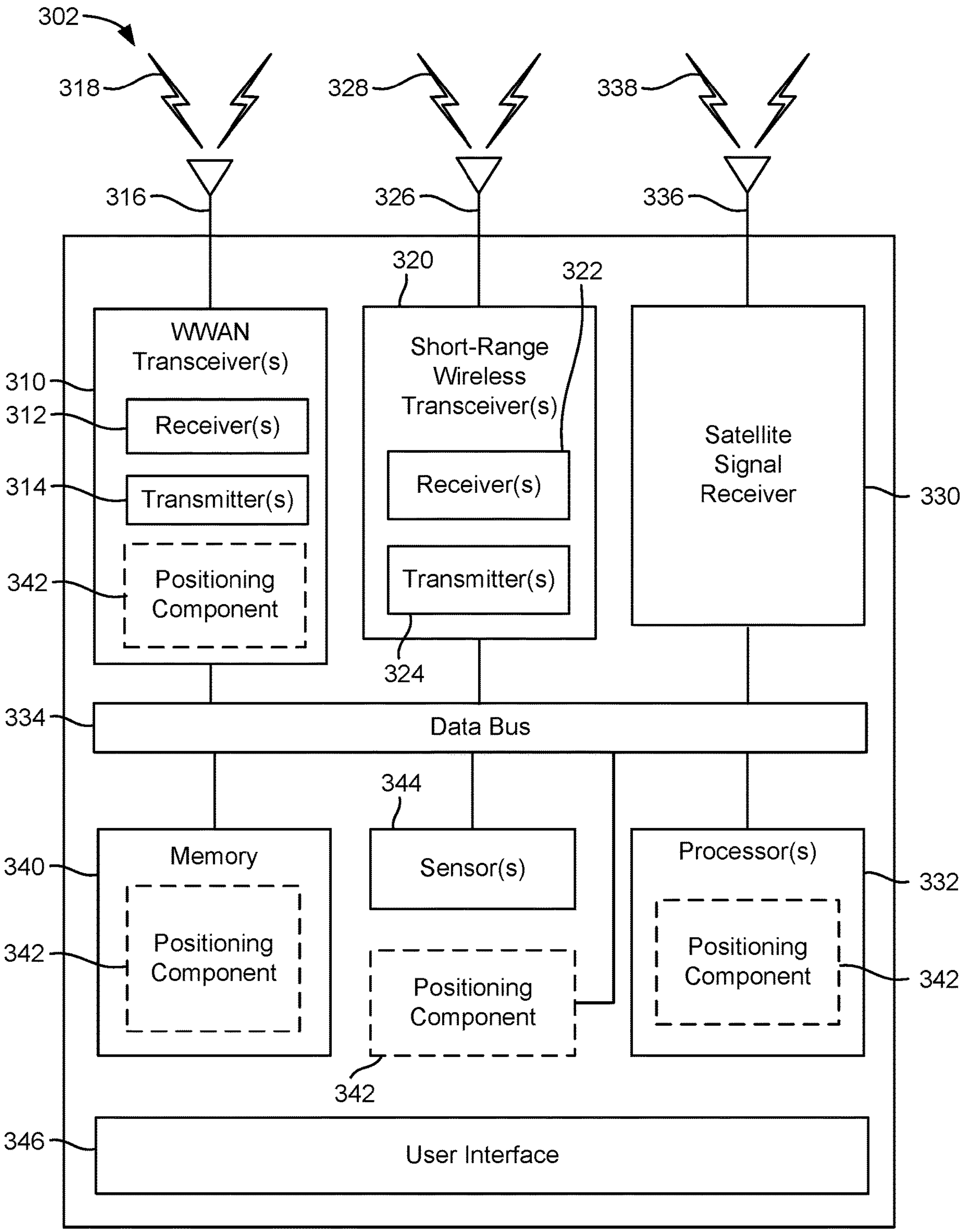
FIGS. 3A, 3B, and 3C are simplified block diagrams of several sample aspects of components that may be employed in a user equipment (UE), a base station, and a network entity, respectively, and configured to support communications as taught herein.
Figure 3B:
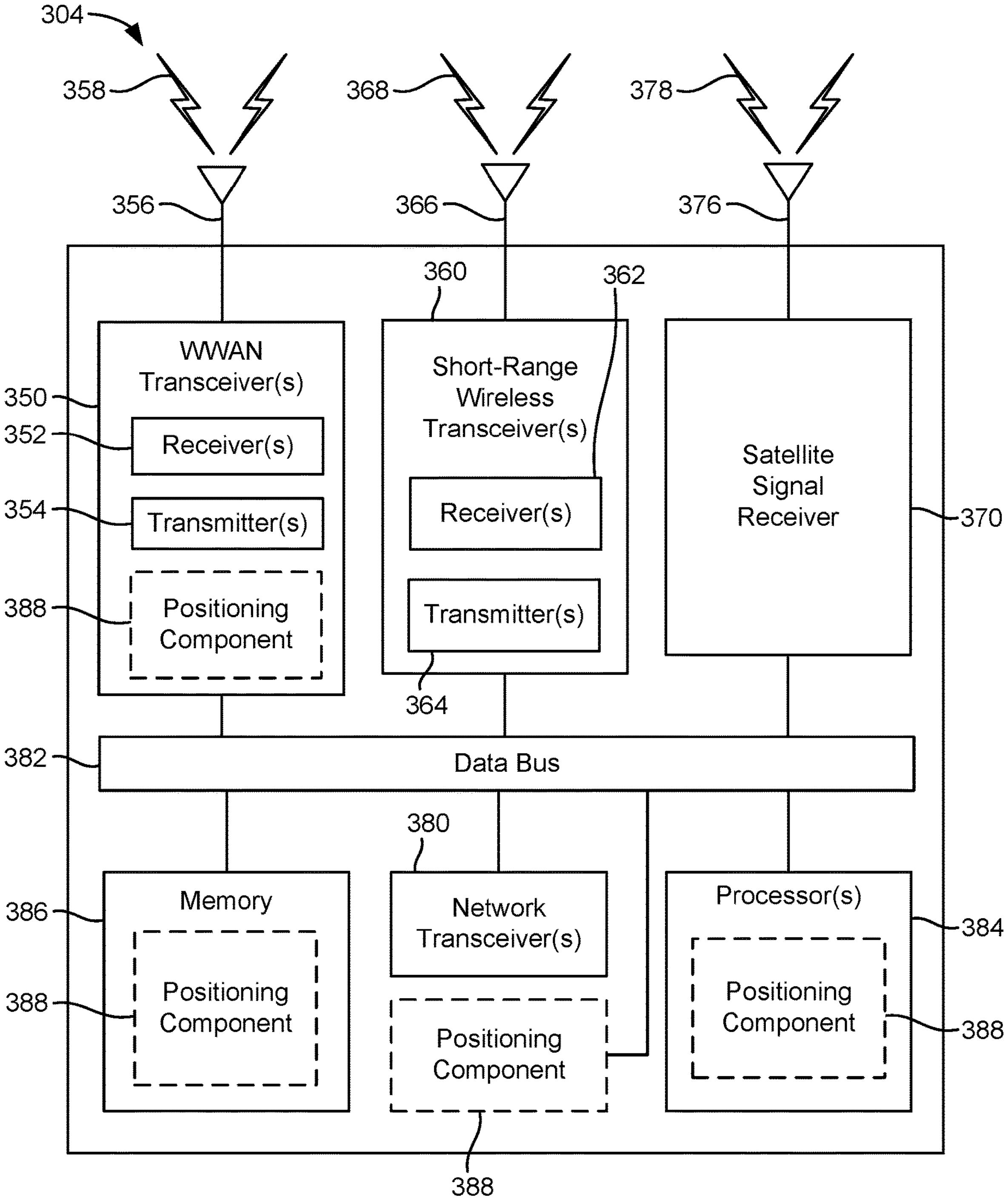
Figure 3C:
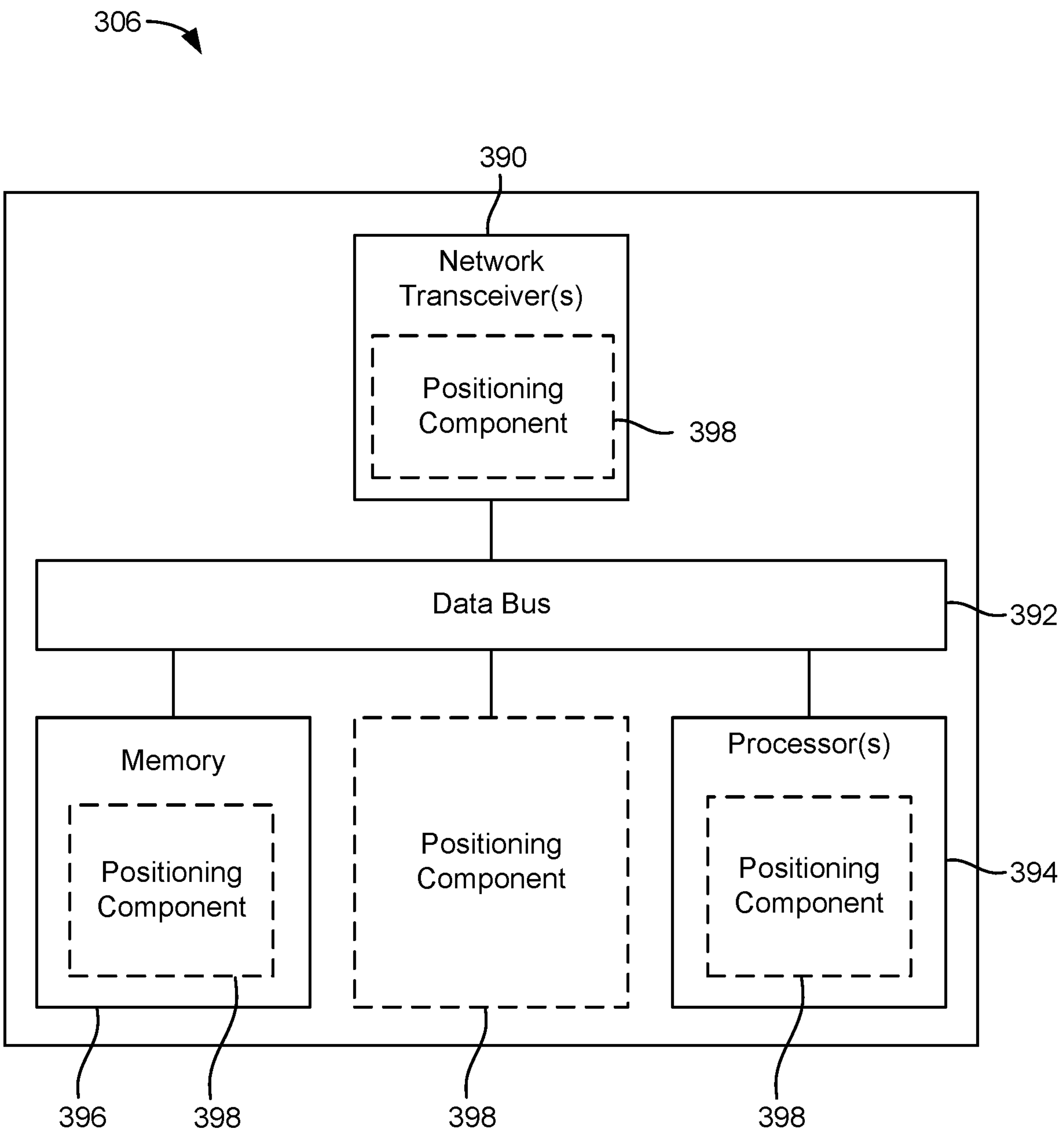

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be GPS signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have WiFi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a WiFi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG-RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
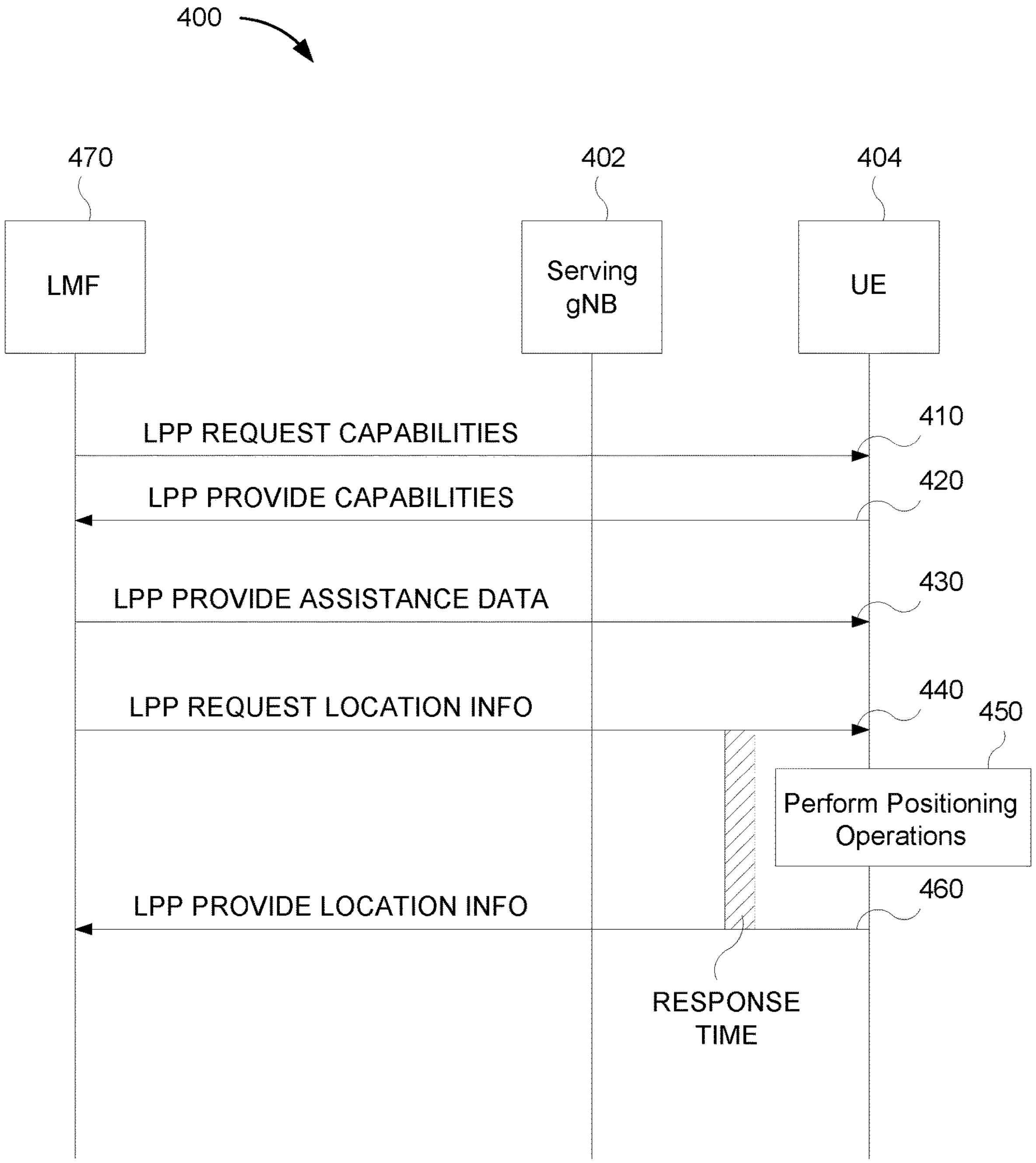
FIG. 4 illustrates an example Long-Term Evolution (LTE) positioning protocol (LPP) call flow between a UE and a location server for performing positioning operations.

FIG. 4 illustrates an example Long-Term Evolution (LTE) positioning protocol (LPP) procedure 400 between a UE 404 and a location server (illustrated as a location management function (LMF) 470) for performing positioning operations. As illustrated in FIG. 4, positioning of the UE 404 is supported via an exchange of LPP messages between the UE 404 and the LMF 470. The LPP messages may be exchanged between UE 404 and the LMF 470 via the UE's 404 serving base station (illustrated as a serving gNB 402) and a core network (not shown). The LPP procedure 400 may be used to position the UE 404 in order to support various location-related services, such as navigation for UE 404 (or for the user of UE 404), or for routing, or for provision of an accurate location to a public safety answering point (PSAP) in association with an emergency call from UE 404 to a PSAP, or for some other reason. The LPP procedure 400 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 404 may receive a request for its positioning capabilities from the LMF 470 at stage 410 (e.g., an LPP Request Capabilities message). At stage 420, the UE 404 provides its positioning capabilities to the LMF 470 relative to the LPP protocol by sending an LPP Provide Capabilities message to LMF 470 indicating the position methods and features of these position methods that are supported by the UE 404 using LPP. The capabilities indicated in the LPP Provide Capabilities message may, in some aspects, indicate the type of positioning the UE 404 supports (e.g., DL-TDOA, RTT, E-CID, etc.) and may indicate the capabilities of the UE 404 to support those types of positioning.

Upon reception of the LPP Provide Capabilities message, at stage 420, the LMF 470 determines to use a particular type of positioning method (e.g., DL-TDOA, RTT, E-CID, etc.) based on the indicated type(s) of positioning the UE 404 supports and determines a set of one or more transmission-reception points (TRPs) from which the UE 404 is to measure downlink positioning reference signals or towards which the UE 404 is to transmit uplink positioning reference signals. At stage 430, the LMF 470 sends an LPP Provide Assistance Data message to the UE 404 identifying the set of TRPs.

In some implementations, the LPP Provide Assistance Data message at stage 430 may be sent by the LMF 470 to the UE 404 in response to an LPP Request Assistance Data message sent by the UE 404 to the LMF 470 (not shown in FIG. 4). An LPP Request Assistance Data message may include an identifier of the UE's 404 serving TRP and a request for the positioning reference signal (PRS) configuration of neighboring TRPs.

At stage 440, the LMF 470 sends a request for location information to the UE 404. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 430 may be sent after the LPP Request Location Information message at 440 if, for example, the UE 404 sends a request for assistance data to LMF 470 (e.g., in an LPP Request Assistance Data message, not shown in FIG. 4) after receiving the request for location information at stage 440.

At stage 450, the UE 404 utilizes the assistance information received at stage 430 and any additional data (e.g., a desired location accuracy or a maximum response time) received at stage 440 to perform positioning operations (e.g., measurements of DL-PRS, transmission of UL-PRS, etc.) for the selected positioning method.

At stage 460, the UE 404 may send an LPP Provide Location Information message to the LMF 470 conveying the results of any measurements that were obtained at stage 450 (e.g., time of arrival (ToA), reference signal time difference (RSTD), reception-to-transmission (Rx-Tx), etc.) and before or when any maximum response time has expired (e.g., a maximum response time provided by the LMF 470 at stage 440). The LPP Provide Location Information message at stage 460 may also include the time (or times) at which the positioning measurements were obtained and the identity of the TRP(s) from which the positioning measurements were obtained. Note that the time between the request for location information at 440 and the response at 460 is the "response time" and indicates the latency of the positioning session.

The LMF 470 computes an estimated location of the UE 404 using the appropriate positioning techniques (e.g., DL-TDOA, RTT, E-CID, etc.) based, at least in part, on measurements received in the LPP Provide Location Information message at stage 460.

In LTE and, at least in some cases, NR, positioning measurements are reported through higher layer signaling, specifically, LTE positioning protocol (LPP) and/or RRC. LPP is used point-to-point between a location server (e.g., location server 230, LMF 270, SLP 272) and a UE (e.g., any of the UEs described herein) in order to position the UE using location-related measurements obtained from one or more reference sources.

An LPP session is used between a location server and a UE in order to obtain location-related measurements or a location estimate or to transfer assistance data. A single LPP session is used to support a single location request (e.g., for a single mobile-terminated location request (MT-LR), mobile originated location request (MO-LR), or network induced location request (NI-LR)). Multiple LPP sessions can be used between the same endpoints to support multiple different location requests. Each LPP session comprises one or more LPP transactions, with each LPP transaction performing a single operation (e.g., capability exchange, assistance data transfer, location information transfer). LPP transactions are referred to as LPP procedures. The instigator of an LPP session instigates the first LPP transaction, but subsequent transactions may be instigated by either endpoint. LPP transactions within a session may occur serially or in parallel. LPP transactions are indicated at the LPP protocol level with a transaction identifier in order to associate messages with one another (e.g., request and response). Messages within a transaction are linked by a common transaction identifier.

Figure 5:
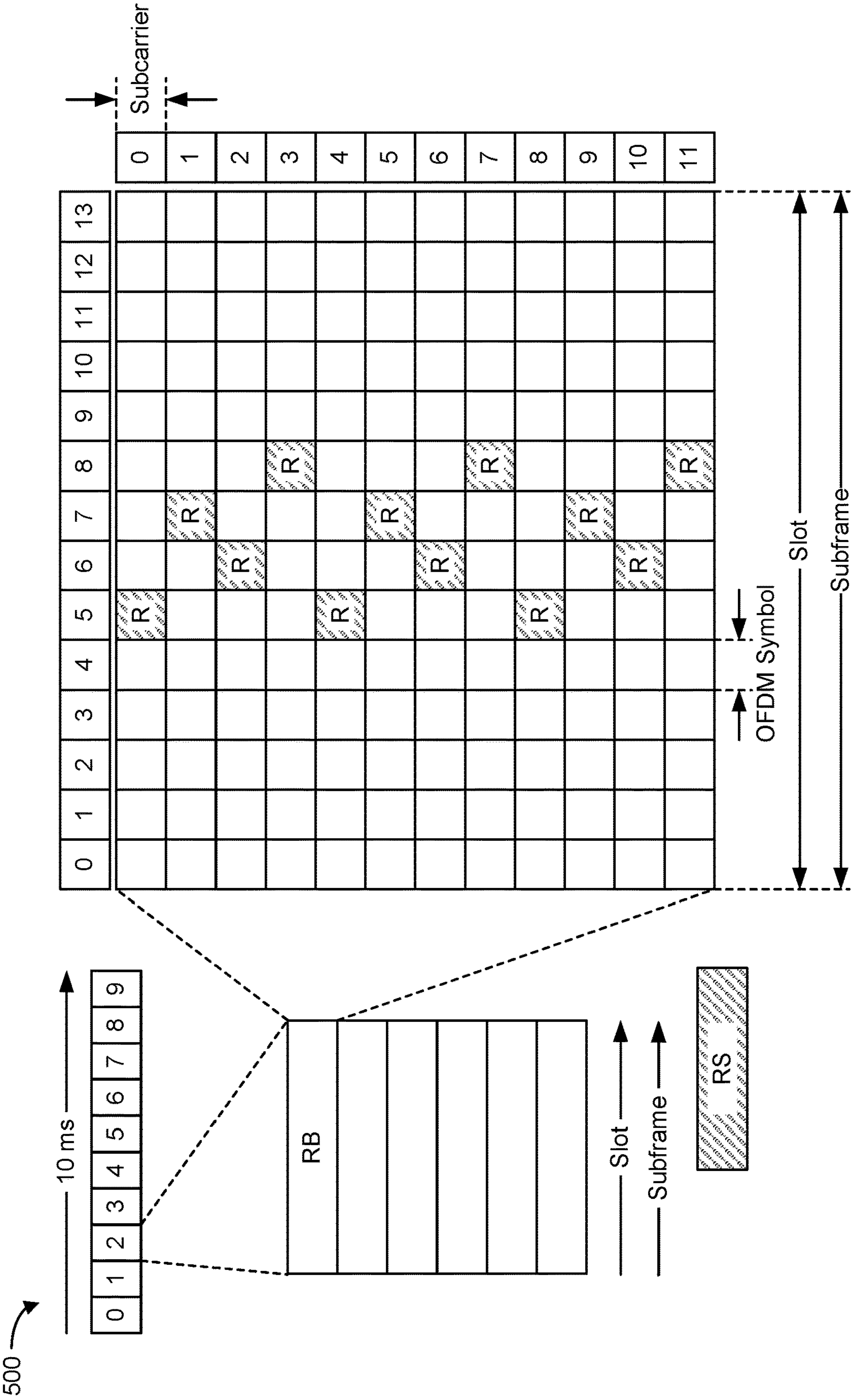
FIG. 5 is a diagram illustrating an example frame structure, according to aspects of the disclosure.

Various frame structures may be used to support downlink and uplink transmissions between network nodes (e.g., base stations and UEs). FIG. 5 is a diagram 500 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 5, a numerology of 15 kHz is used. Thus, in the time domain, a 10 ms frame is divided into 10 equally sized subframes of 1 ms each, and each subframe includes one time slot. In FIG. 5, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 5, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 5 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 5 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 6); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LPP session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 6:
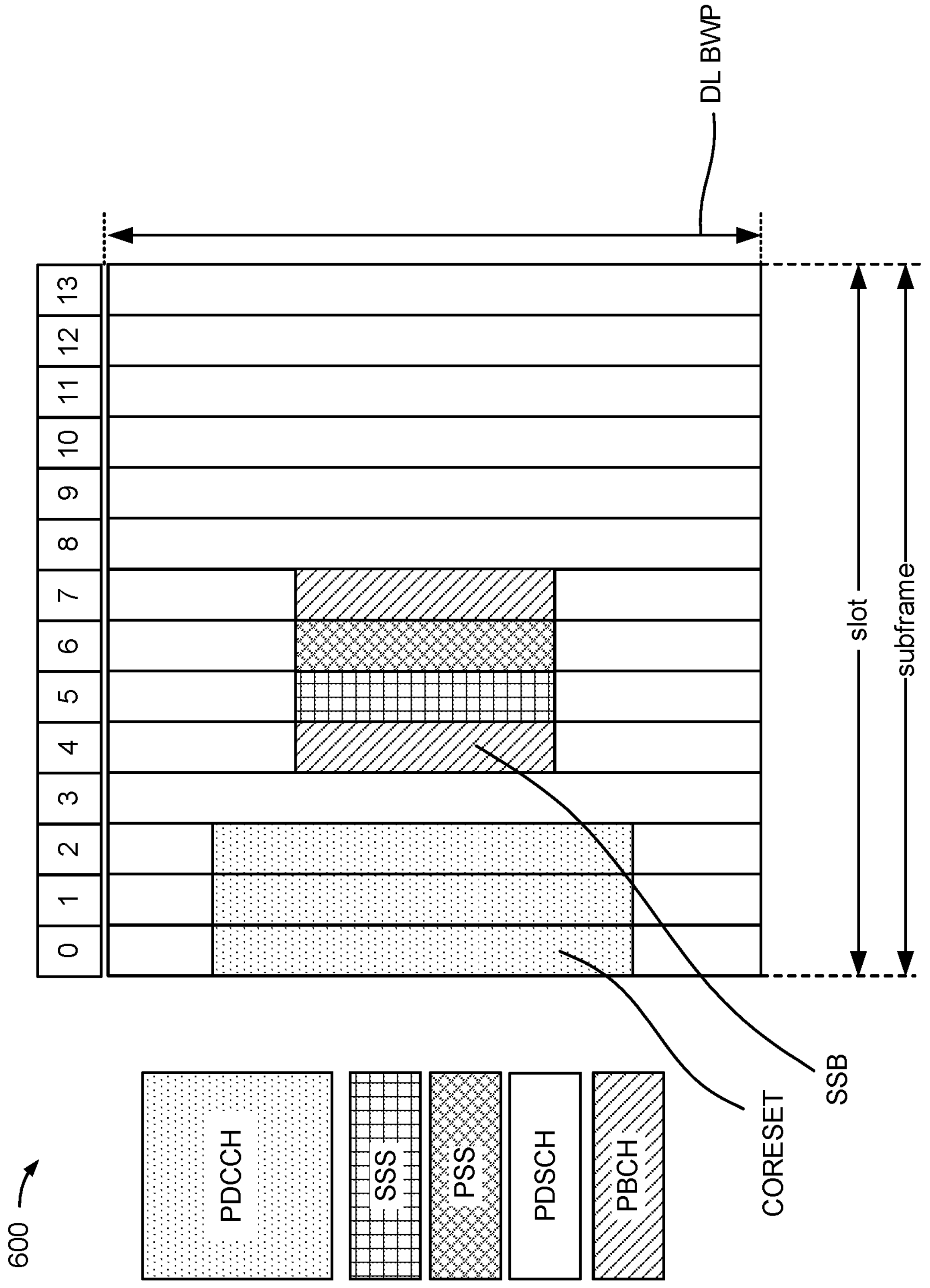
FIG. 6 is a diagram illustrating various downlink channels within an example downlink slot, according to aspects of the disclosure.

FIG. 6 is a diagram 600 illustrating various downlink channels within an example downlink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

In NR, the channel bandwidth, or system bandwidth, is divided into multiple BWPs. A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 6, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The Physical Broadcast Channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 6, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 6 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 7:
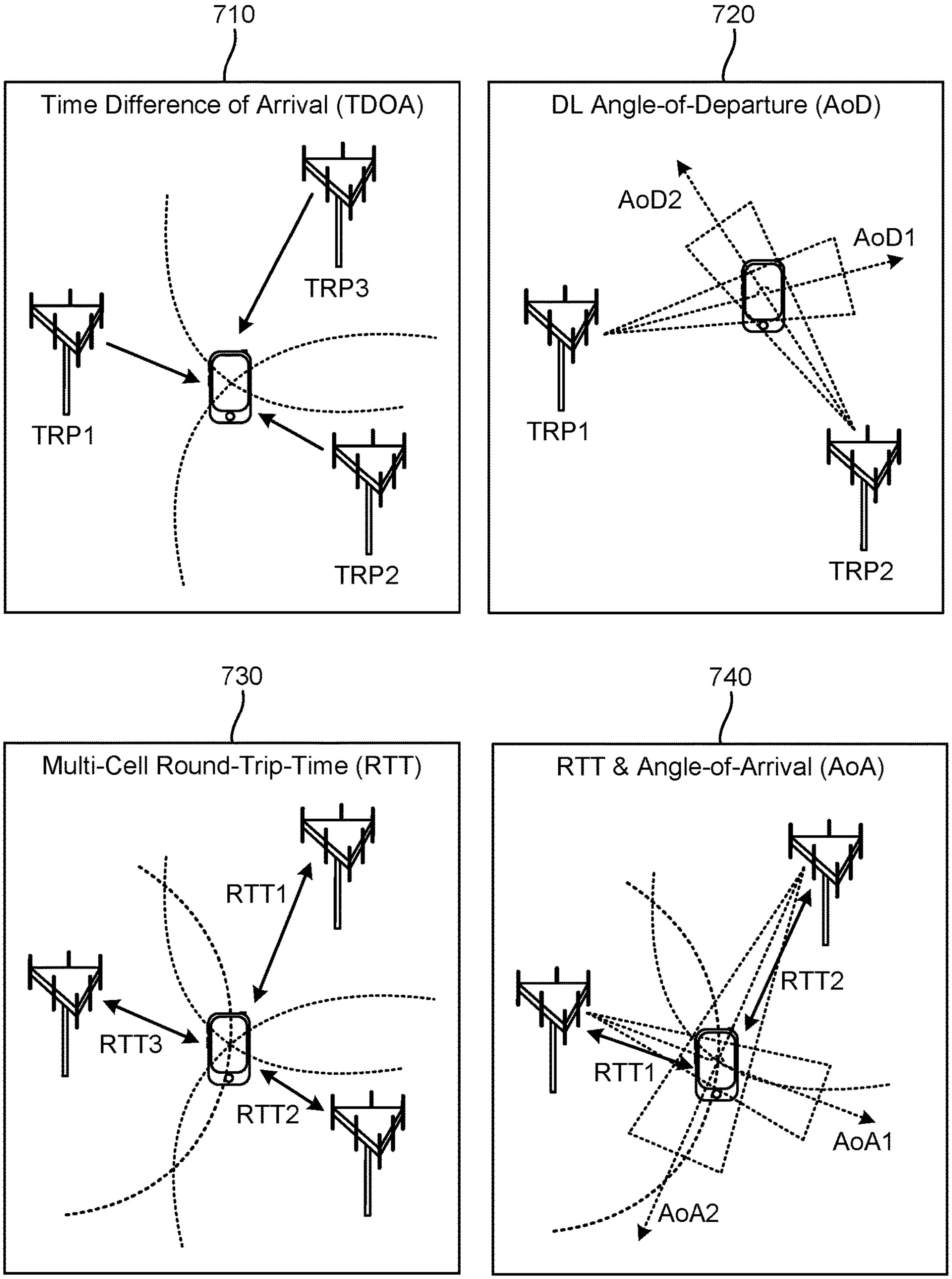
FIG. 7 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 7 illustrates examples of various positioning methods, according to aspects of the disclosure. In an OTDOA or DL-TDOA positioning procedure, illustrated by scenario 710, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, illustrated by scenario 720, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 730, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques as shown at 740, such as UL-AoA and DL-AoD, to improve location accuracy as shown at scenario 740.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 8:
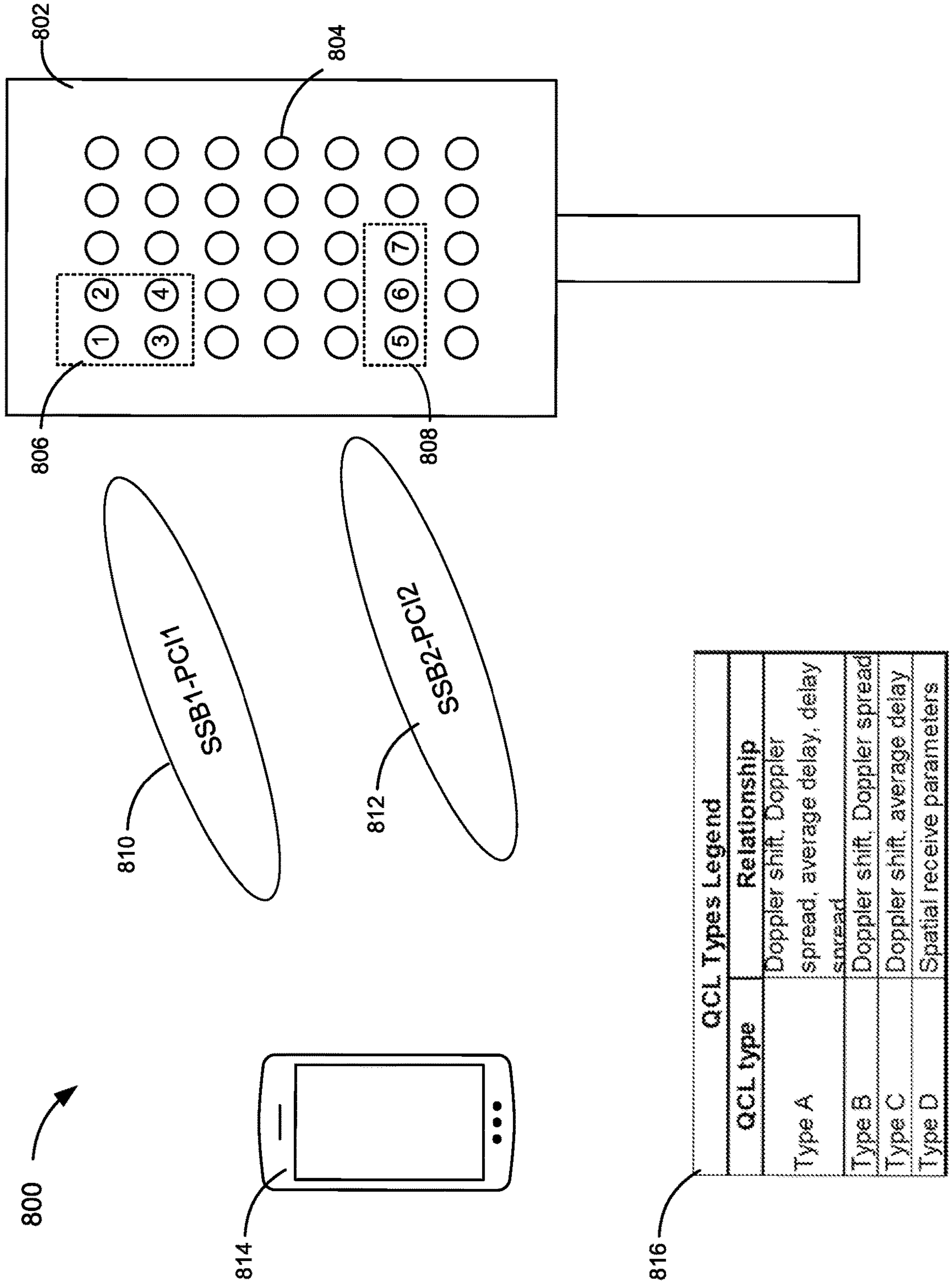
FIG. 8 shows an example of an electronic environment illustrating quasi-colocation (QCL) principles with respect to multiple antenna beams/cells.

FIG. 8 shows an example electronic environment 800 illustrating QCL principles with respect to multiple antenna beams/cells. In this example, antenna panel 802 includes a plurality of physical antenna elements 804.

QCL features and procedures are not described with respect to the physical construction of the antenna panel 802 and physical antenna elements 804. Rather, QCL features and procedures are addressed with reference to antenna ports. An antenna port is a logical entity rather than a physical antenna. An antenna port is a stream of information in the transmitter which carries one or more physical channels and physical signals, and which drives one or more physical antennas using digital precoding and/or analog spatial filtering. An antenna port functions such that the channel over which a symbol on the antenna port is conveyed can be inferred from the channel over which another symbol on the same antenna port is conveyed.

An antenna port may be associated with a single physical antenna element 804 or a beam formed from a subarray of physical antenna elements 804. The example of FIG. 8 depicts two antenna ports shown as antenna port 806 and antenna port 808. Antenna port 806 is logically associated with a subarray of physical antenna elements 804 comprised of physical antenna elements 804 labeled 1-4, which are used to form an antenna beam 810 carrying a corresponding signal. Antenna port 808 is logically associated with a subarray of physical antenna elements 804 labeled 5-7, which are used to form an antenna beam 812 carrying a corresponding signal.

In an aspect, an antenna beam may be assigned an identifier corresponding to the data conveyed by the signals transmitted by the antenna beam. In this example, the signal on antenna beam 810 carries data for an SSB having an SSB identifier (e.g., SSB index that identifies a particular SSB) of "SSB1." SSB1 is therefore used as an identifier for antenna beam 810, which carries the synchronization signal (SS) and the Physical Broadcast Channel (PBCH) associated with an SSB having the identifier SSB1. SSB1 is also associated with a physical cell identity (PCI) (e.g., a physical cell having a corresponding physical cell identifier, shown as PCI1 in the example of FIG. 8). In certain aspects of the disclosure, an antenna beam is identified by the SSB identifier and corresponding PCI with which the antenna beam is associated, although any identifier that is unique to the antenna beam may be used. As such, the antenna beam 810 shown in FIG. 8 has a corresponding identifier of SSB1-PCI1. Similarly, antenna beam 812 carries data for an SSB having an SSB identifier of "SSB2." SSB2 is also associated with a physical cell identity identifier of PCI2. Antenna beam 812, therefore, has a corresponding identifier of SSB2-PCI2 in this example. In accordance with certain aspects of the disclosure, antenna beam 810 and antenna beam 812 may be considered as different cells that are identified as SSB1-PCI1 and SSB2-PCI2, respectively. It is contemplated that the specific cell identification aspects disclosed herein may be extended to other manners of cell and/or SSB identification.

FIG. 8 shows a UE 814 receiving signals from cell SSB1-PCI1 as well as cell SSB2-PCI2 from antenna port 806 and antenna port 808, respectively. Unless informed otherwise, the UE assumes that the signals from antenna port 806 and antenna port 808 experience different channel characteristics. The UE, therefore, does not infer that the channels have similar characteristics. However, the UE 814 may infer similarity between the channels if the antenna port 806 and antenna port 808 are quasi-colocated.

Transmit beams may be quasi-co-located, meaning that they appear to the receiver (e.g., a UE) as having the same parameters, regardless of whether or not the transmitting antennas of the network node themselves are physically co-located. In NR, there are four types of QCL relations. Specifically, a QCL relation of a given type means that certain parameters about a second reference RF signal on a second beam can be derived from information about a source reference RF signal on a source beam. In the example of FIG. 8, the UE 814 may infer that the signal carried by antenna beam 810 and the signal carried by antenna beam 812 experience similar parameters if antenna port 806 and antenna port 808 are quasi-colocated.

The channel properties which may be common across the antenna ports include Doppler spread/shift, average delay, delay spread, average gain, and spatial receive parameters. These channel properties are known as "large-scale properties." A short description of each large-scale property is given below and classified by QCL type in table 816 of FIG. 8. The large-scale properties may be defined in the following manner:

Doppler Shift: Doppler shift is a shift in the frequency of the radio signal relative to the motion of the receiver.

Doppler Spread: Doppler Spread is the fading rate, the difference between the signal frequency transmitted at the transmitter and the signal frequency received at the UE with respect to time.

Delay: When a signal is transmitted from multiple antennas, the signal often reaches the UE through multiple paths due to signal reflection from surrounding clutter. In a multi-path scenario, the average time taken to receive all the multi-path signal components at the UE is known as average delay.

Delay Spread: The difference between the time of arrival of the earliest significant multi-path component of the signal (i.e., typically the line of sight (LOS) component) and the time of arrival of the last multi-path component is known as delay spread.

Spatial Receive Parameter: Spatial Receive Parameter refers to beam forming properties of a signal received at the UE, such as a dominant Angle of Arrival and average Angle of Arrival of the signal received at the UE.

With reference to FIG. 8, table 816 depicts four QCL types and the large-scale property relationships associated with each QCL type. As shown, antenna ports (and, by extension, antenna beams and cells) that are determined to be QCL Type A are transmitted over channels having similar Doppler shift, Doppler spread, average delay, and delay spread properties. Antenna ports (and, by extension, antenna beams and cells) that are determined to be QCL Type B are transmitted over channels having similar Doppler shift and Doppler spread properties. Antenna ports (and, by extension, antenna beams and cells) that are determined to be QCL Type C are transmitted over channels having similar Doppler shift and average delay properties. Antenna ports (and, by extension, antenna beams and cells) that are determined to be QCL Type D are transmitted over channels having similar spatial receive parameter properties.

QCL information is included in a variety of information elements used in 3GPP 5G NR standards. QCL related information elements are included in system information block type 2 (SIB2). SIB2 contains cell re-selection information common for intra-frequency, inter-frequency and/or inter-RAT cell re-selection (i.e. applicable for more than one type of cell re-selection but not necessarily all) as well as intra-frequency cell re-selection information other than neighboring cell related. SIB2 includes an ssb-PositionQCL-Common information element and an SSB-PositionQCL-Relation information element. Similarly, QCL related information elements are included in system information block type 4 (SIB4). SIB4 contains information relevant only for inter-frequency cell re-selection (i.e. information about other NR frequencies and inter-frequency neighboring cells relevant for cell re-selection.) The SIB4 information element includes cell re-selection parameters common for a frequency as well as cell specific re-selection parameters. SIB4 includes an ssb-PositionQCL-Common information element and an SSB-PositionQCL-Relation information elements.

With respect to the QCL related information elements in SIB2 and SIB4, the ssh-PositionQCL-Common information element indicates the QCL relationship between SS/PBCH blocks for intra-frequency neighbor cells. The SSB-PositionQCL-Relation information element in SIB2 and SIB4 is used to indicate the QCL relationship between SSB positions on the frequency indicated by the ssbFrequency information element found in each of SIB2 and SIB4 for operation with shared spectrum channel access. In accordance with one aspect of the disclosed system, the information in the ssh-PositionQCL-Common information element and SSB-PositionQCL-Relation information elements of SIB2 and SIB4 may be used by a UE to determine which neighboring cells have a QCL relationship.

In an aspect, a location server may direct a UE to measure reference signals of neighboring cells using information elements that include QCL relationships of the neighboring cells. To this end, a MeasObjNR information element may be provided to the UE. The MeasObjectNR information element specifies information applicable for SS/PBCH block(s) intra/inter-frequency measurements and/or CSI-RS intra/inter-frequency measurements. The MeasObjectNR information element includes an SSB-PositionQCL-Cells-toAddMod information element. SSB-PositionQCL-Cells-toAddMod information element includes a physCellid information element providing the PCI of a cell in a cell list that is to be measured. The MeasObjectNR information element also includes a ssb-PositionQCL information element, which indicates the QCL relationship between SS/PBCH blocks for a specific cell. If provided, the cell specific value in the ssb-PositionQCL information element overwrites the value signaled by the ssb-PositionQCL-Common information element of the MeasObjectNR. In one aspect, the UE may use the QCL information associated with the neighboring cells identified in the MeasObjNR information element to determine which neighborhood cells have a QCL relationship.

As shown and discussed in connection with FIG. 7, various positioning methods have been proposed for 5G positioning. These positioning methods involve the measurement of reference signals (e.g., PRS) from multiple cells to allow the location server or UE to perform ranging and obtain a positioning fix of the UE. Measurements of the reference signals of multiple neighboring cells are performed within a stipulated timeout period specified in the QoS, as described above with reference to the response time of FIG. 4. However, a UE can perform only a finite/limited number of measurements within the timeout period.

The performance of positioning determinations depends on the neighboring cells selected for measurements/ranging. To this end, the UE should select cells for measurement which provide geometric diversity so that the selected cells are distributed across different directions and not skewed on one side to reduce the effects of geometric dilution of precision (GDOP). Further, the UE should select cells for measurement that provide an accurate initial UE coarse position estimation for a better articulation of AD.

FIG. 9 is a flowchart 900 depicting operations of an example method of wireless communication performed by a UE. At operation 902, the UE receives system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells. In an aspect, the system information is received from the serving cell of the UE.

In an aspect, operation 902 may be performed by the one or more WWAN transceivers 310, the one or more processors 332, memory 340, and/or positioning component 342, any or all of which may be considered means for performing this operation.

As part of a positioning session, such as a positioning session using the LPP protocol described in connection with FIG. 4, the UE initially reports the UE positioning capability and a list of neighboring cells that the UE can measure to one or more location servers (e.g., location server 172 of FIG. 1). Using the list of neighboring cells reported by the UE, the location server may obtain a coarse initial estimate of the location of the UE. The list of neighboring cells provided by the UE may also be used by the location server to articulate AD to the UE. The AD conveyed from the location server to the UE may include an identification of the neighboring cells that the UE is to measure during the positioning session.

During the positioning session, the UE may attempt to execute measurements of reference signals of all neighboring cells articulated in the AD. The UE, however, has a limited time in which to execute the measurements and transmit the results to the location server (see, e.g., response time for performing positioning operations at stage 450 of FIG. 4). Additionally, the number of neighboring cells for which measurements are taken and the location and geometric arrangement of the neighboring cells impact the performance of the positioning operations. In an aspect, the disclosed system uses the QCL information for the identifiers assigned to different cells to conduct the measurements. As an example, the QCL information may be used to reduce the number of neighboring cells which are reported to the location server in the capability information at stage 420 so that the AD subsequently sent to the UE by the location server at stage 430 includes fewer neighboring cells for which measurements are taken during the limited time available to the UE for conducting the positioning measurements.

At operation 904, the UE reports, to a location server, identifiers of one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells In an aspect, the UE may also report neighboring cells to the location server that do not have a QCL relationship with any other neighboring cell of the plurality of neighboring cells. In an aspect, operation 904 may be performed by the one or more WWAN transceivers 310, the one or more processors 332, memory 340, and/or positioning component 342, any or all of which may be considered means for performing this operation.

Figure 10:
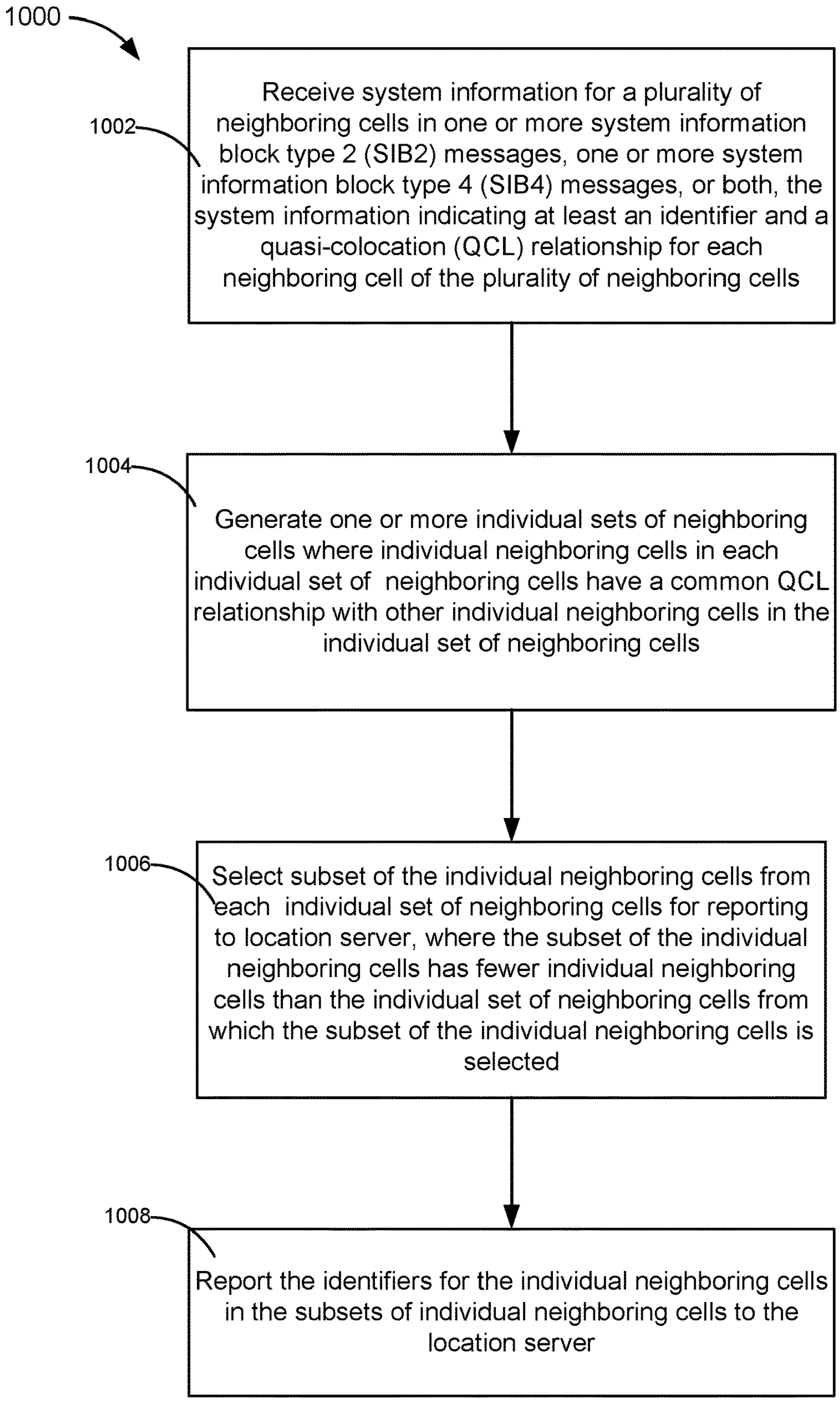
FIG. 10 is a flowchart depicting operations of an example method of wireless communication performed by a UE in which only a subset of neighboring cells of a set of neighboring cells is reported to the location server, according to aspects of the disclosure.

FIG. 10 is a flowchart 1000 depicting operations of an example method of wireless communication performed by a UE in which only a subset of neighboring cells of a set of neighboring cells is reported to the location server. At operation 1002, the UE receives system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells. In an aspect, the system information is received from the serving cell of the UE. In an aspect, operation 1002 may be performed by the one or more WWAN transceivers 310, the one or more processors 332, memory 340, and/or positioning component 342, any or all of which may be considered means for performing this operation.

At operation 1004, the UE generates one or more individual sets of neighboring cells where individual neighboring cells in each individual set of neighboring cells have a common QCL relationship with other individual neighboring cells in the individual set of neighboring cells. At operation 1006, the UE selects a subset of the individual neighboring cells from each individual set of neighboring cells for reporting to location server, where the subset of the individual neighboring cells has fewer individual neighboring cells than the individual set of neighboring cells from which the subset of the individual neighboring cells is selected. In an aspect, the subset of the individual neighboring cells has only a single individual neighboring cell from the individual set of neighboring cells from which the subset of the individual neighboring cells is selected. In an aspect, the UE may apply selection criterion in selecting the subset of neighboring cells from the set of neighboring cells. For example, the UE may rank neighboring cells by the strength of signals received from the neighboring cells of the set of neighboring cells and select neighboring cells having the best signal strength for the subset for reporting. As another example, the UE may select neighboring cells for the subset based on the geometrical layout of a neighboring cell with respect to other neighboring cells that the UE can detect to achieve geometric diversity with respect to the reported neighboring cells. It is contemplated that other selection criteria may be used, the foregoing selection criterion constituting non-limiting examples.

Once subsets of the individual neighboring cells have been selected from all of the individual sets of neighboring cells, the UE may report the identifiers for the individual neighboring cells in the subsets of individual neighboring cells to the location server at operation 1008. In an aspect, operation 1004 through operation 1008 may be performed by the one or more WWAN transceivers 310, the one or more processors 332, memory 340, and/or positioning component 342, any or all of which may be considered means for performing this operation.

Figure 11:
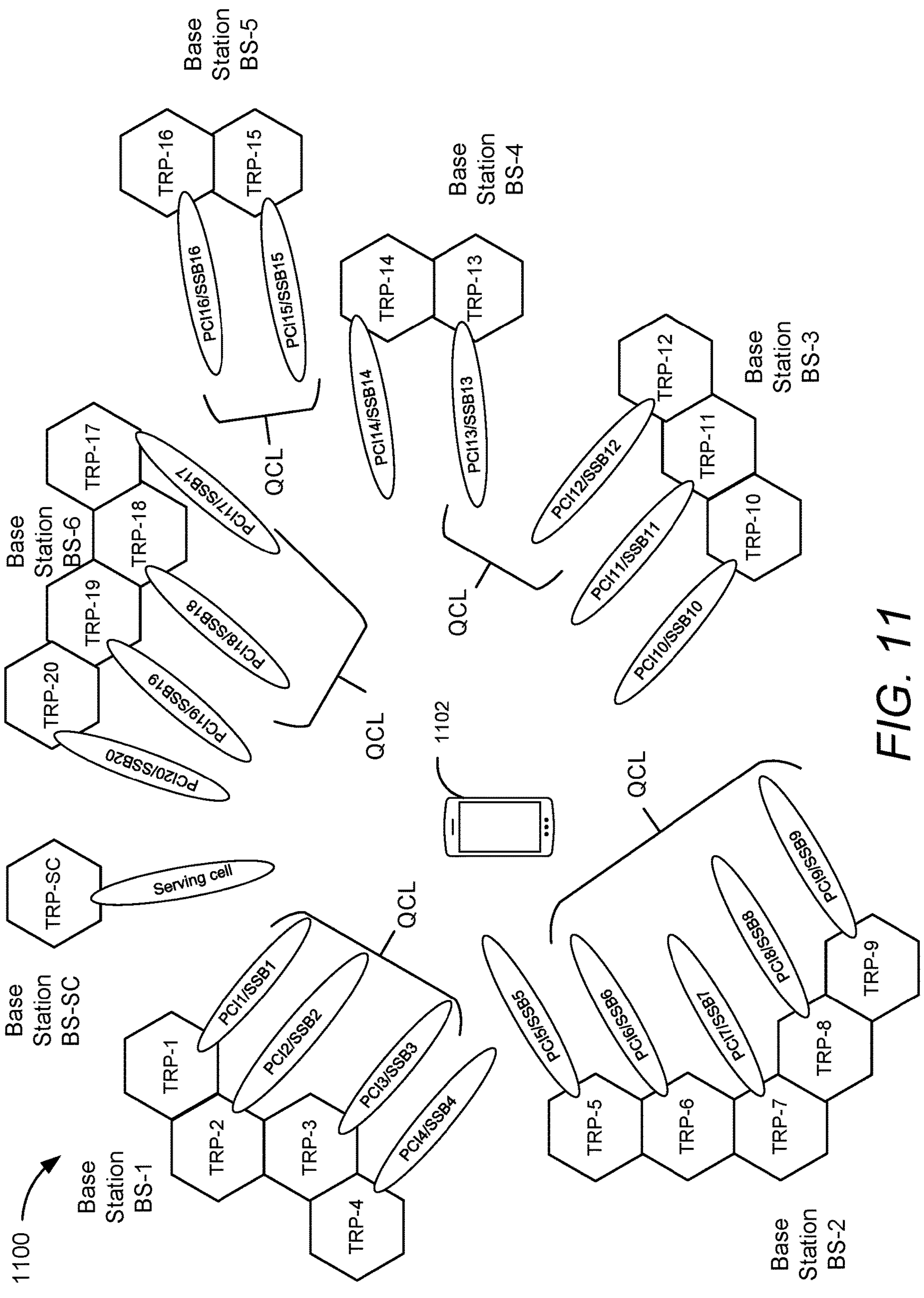
FIG. 11 depicts an example system in which certain aspects of the disclosure may be implemented.

FIG. 11 depicts an example system 1100 in which certain aspects of the disclosure may be implemented. The example system 1100 includes a UE 1102 that is configured to receive signals from a plurality of cells. The plurality of cells includes cells that are transmitted from multiple TRPs. TRP-SC is the TRP associated with a Base Station BS-SC of the serving cell used by the UE 1102 to report neighboring cells to the location server. The remaining TRPs (e.g., TRP-1 through TRP-20) are associated with neighboring cells that the UE 1102 can detect for reporting to the location server. In this example, TRP-1 through TRP-20 are respectively associated with cells PCI1/SSB1 through PCI20/SSB20. In an aspect, each neighboring cell may be associated with a physical cell site, such as a base station, shown as Base Station BS-1 through Base Station BS-6 in the example of FIG. 11. However, the disclosure contemplates other types of physical cell sites. Here, Base Station BS-1 through Base Station BS-6 are merely examples of physical cell sites used in describing aspects of the disclosure.

The UE 1102 may receive system information from the neighboring cells, PCI1/SSB1 through PCI20/SSB20. In an aspect, the system information indicates at least an identifier of the cell (e.g., the PCI and SSB identifiers PCI1/SSB1 through PCI20/SSB20) and a QCL relationship for each neighboring cell of the plurality of neighboring cells. In an aspect, the system information is received from the serving cell and includes the QCL relationships for all neighboring cells.

In the example system 1100, TRP-1 through TRP-4 are associated with respective neighboring cells PCI1/SSB1 through PCI4/SSB4. TRP-1 through TRP-4 are also associated with a common physical cell site, shown as Base Station BS-1 in the example. Here, the system information indicates that PCI1/SSB1, PCI 2/SSB2, and PCI3/SSB3 have common QCL properties while PCI4/SSB4 does not have QCL properties that are common with any other cells.

In the example system 1100, TRP-5 through TRP-9 are associated with respective neighboring cells PCI5/SSB5 through PCI9/SSB9. TRP-5 through TRP-9 are also associated with a common physical cell site, shown as Base Station BS-2 in this example. Here, the system information indicates that PCI6/SSB6, PCI7/SSB7, PCI8/SSB8, and PCI9/SSB9 have common QCL properties while PCI5/SSB5 does not have QCL properties that are common with any other cells.

In the example system 1100, TRP-10 through TRP-12 are associated with respective neighboring cells PCI10/SSB10 through PCI12/SSB12. TRP-10 through TRP-12 are associated with a common physical cell site, shown as Base Station BS-3 in this example. TRP-13 and TRP-14 are associated with respective neighboring cells PCI13/SSB13 and PCI14/SSB14. TRP-13 and TRP-14 are associated with a common physical cell site, shown as a Base Station BS-4 in this example. Here, the system information indicates that PCI12/SSB12 and PCI13/SSB13 have common QCL properties even though each one is associated with a different base station since QCL between cells is not limited cells associated with the same base station. PCI10/SSB10 and PCI11/SSB11 do not have QCL properties that are common with any other cells.

In the example system 1100, TRP-15 and TRP-16 are associated with respective neighboring cells PCI15/SSB15 and PCI16/SSB16. TRP-15 and TRP-16 are also associated with a common physical cell site, shown as Base Station BS-5 in this example. In this example, the system information indicates that there is a QCL relationship between PCI15/SSB15 and PCI16/SSB16.

In the example system 1100, TRP-17 through TRP-20 are associated with respective neighboring cells PCI17/SSB17 through PCI20/SSB20. TRP-17 through TRP-30 are also associated with a common physical cell site, shown as Base Station BS-6 in this example. Here, the system information indicates that cells PCI17/SSB17 and PCI18/SSB18 have common QCL properties while cells PCI19/SSB19 and PCI20/SSB20 do not have QCL properties that are common with any other cells.

FIG. 12 shows an example manner in which the UE processes the system information for QCL relationships to generate sets of neighboring cells in which each neighboring cell of each set includes neighboring cells having common QCL relationships. In an aspect, each set of neighboring cells is associated with a corresponding base station. In an aspect, each set of neighboring cells is associated with neighboring cells that are generally located proximate one another without regard to the particular base station with which the neighboring cells are associated.

Table 1202 of FIG. 12 shows neighboring cells that do not have a QCL relationship with any other neighboring cell. In this example, the set of neighboring cells that do not have any QCL relationship with any other neighboring cell include PCI4/SSB4, PCI5/SSB5, PCI10/SSB10, PCI11/SSB11, PCI14/SSB14, PCI19/SSB19, and PCI20/SSB20. In an aspect, all cells that do not have a QCL relationship with any other cells will be reported to the location server by the UE.

The remaining tables of FIG. 12 shows neighboring cell sets, wherein each neighboring cell within the set of neighboring cells has a common QCL relationship. In an aspect, the UE may rank or otherwise identify each neighboring cell in a given neighboring cell set to determine which neighboring cell/cells in the neighboring cell set are likely to allow the UE to provide the best measurements during a positioning session. In at least one aspect, only a subset of the neighboring cells of each neighboring cell set is reported to the location server, where the number of neighboring cells in the subset is less than the number of neighboring cells from which the neighboring cells in the subset are selected. In an aspect, only neighboring cells within each set of neighboring cells meeting a predetermined signal strength, power, channel quality, etc., are reported to the location server by the UE for use in AD neighboring cell selection. In an aspect, the signal strength of a neighboring cell may be based on Received Signal Strength Indication (RSSI) measurements. In another aspect, the power of a signal received from a neighboring cell may be based on Reference Signal Received Power (RSRP) of the neighboring cell. In another aspect, the selection of the subset neighboring cell/cells for reporting by the UE may be based on Reference Signal Received Quality (RSRQ) of the neighboring cell. In another aspect, the selection of the subset neighboring cell/cells for reporting by the UE may be based on Signal to Interference Plus Noise Ratio (SINR) of the neighboring cell. In another aspect, the UE may assign a composite score to neighboring cells in the subset of neighboring cells, where the composite score is derived from one or more of the foregoing signal/channel measurements. This manner of selection of neighboring cells for inclusion in a subset of neighboring cells allows the UE to develop and optimized set of neighboring cells that are reported to the location server for generation of AD by the location server.

In the example shown in FIG. 12, the UE has ranked each neighboring cell in each set of neighboring cells based on the RSSI respectively associated with the neighboring cell. The neighboring cells in each set of neighboring cells have been ranked numerically, where 1 corresponds to the neighboring cell having the highest RSSI at the UE. In certain aspects, the values for the actual measurements of a reference signal may be used in a determination as to whether a neighboring cell is included in a subset of neighboring cells. It is contemplated that other criterion may be used in the selection of a neighboring cell for the subset of neighboring cells, the examples and ranking system described herein being merely a non-limiting example of neighboring cell subset selection criterion.

FIG. 12 shows a set of neighboring cells 1204 labeled Cell Set 1, where each neighboring cell of the set of neighboring cells 1204 has a common QCL relationship. In this example, the set of neighboring cells 1204 includes neighboring cell PCI1/SSB1 having a relative received signal strength rank of 3 with respect to other neighboring cells of the set of neighboring cells 1204, neighboring cell PCI2/SSB2 having a relative received signal strength rank of 1 with respect to other neighboring cells of the set of neighboring cells 1204, and neighboring cell PCI3/SSB3 having a relative received signal strength rank of 2 with respect to other neighboring cells of the set of neighboring cells 1204.

FIG. 12 also shows a set of neighboring cells 1206 labeled Cell Set 2, where each neighboring cell of the set of neighboring cells 1206 has a common QCL relationship. In this example, the set of neighboring cells 1206 includes neighboring cell PCI6/SSB6 having a relative received signal strength rank of 2 with respect to other neighboring cells of the set of neighboring cells 1206, neighboring cell PCI7/SSB7 having a relative received signal strength rank of 1 with respect to other neighboring cells of the set of neighboring cells 1206, neighboring cell PCI8/SSB8 having a relative received signal strength rank of 3 with respect to other neighboring cells of the set of neighboring cells 1206, and neighboring cell PCI9/SSB9 having a relative received signal strength rank of 1 with respect to other neighboring cells of the set of neighboring cells 1206.

FIG. 12 also shows a set of neighboring cells 1208 labeled Cell Set 3, where each neighboring cell of the set of neighboring cells 1208 has a common QCL relationship. In this example, the set of neighboring cells 1208 includes neighboring cell PCI11/SSB11 having a relative received signal strength rank of 1 and neighboring cell PCI12/SSB12 having a relative received signal strength rank of 2 with respect to neighboring cell PCI11/SSBR11.

FIG. 12 also shows a set of neighboring cells 1210 labeled Cell Set 4, where each neighboring cell of the set of neighboring cells 1210 has a common QCL relationship. In this example, the set of neighboring cells 1210 includes neighboring cell PCI15/SSB15 having a relative received signal strength rank of 1 and neighboring cell PCI16/SSB16 having a relative received signal strength rank of 2 with respect to neighboring cell PCI15/SSBR15.

FIG. 12 also shows a set of neighboring cells 1212 labeled Cell Set 5, where each neighboring cell of the set of neighboring cells 1212 has a common QCL relationship. In this example, the set of neighboring cells 1212 includes neighboring cell PCI17/SSB17 having a relative received signal strength rank of 2 and neighboring cell PCI18/SSB18 having a relative received signal strength rank of 1 with respect to neighboring cell PCI117/SSBR17.

FIG. 13 shows one example of a set of neighboring cells 1300 that are reported by the UE to the location server. In this example, all of the neighboring cells that do not have a QCL relationship with other neighboring cells are reported. Neighboring cells that are not quasi-colocated but reported to the location server in this example include PCI4/SSB4, PCI5/SSB5, PCI10/SSB10, PCI11/SSB11, PCI14/SSB14, PCI19/SSB19, and PCI20/SSB20. Additionally, only one neighboring cell (e.g., a subset of neighboring cells) in each set of neighboring cells is selected for reporting to the location server. In the example shown in FIG. 13, only the neighboring cell in each set of neighboring cells having the highest-ranked signal strength in each set of neighboring cells having a common QCL relationship is reported to the location server by the UE. The neighboring cells from each set of neighboring cells having a common QCL reported by the UE to the location server include in this example PCI2/SSB2 (from Cell Set 1), PCI9/SSB9 (from Cell Set 2), PCI11/SSB11 (from Cell Set 3), PCI15/SSB15 (from Cell Set 4), and PCI18/SSB18 (from Cell Set 5). In an aspect, the identifiers of the neighboring cells of the plurality of neighboring cells are reported to the location server based on being inter-frequency to the UE. In an aspect, the identifiers of the one or more neighboring cells of the plurality of neighboring cells include only neighboring cells having a common QCL type.

In certain aspects, the set of neighboring cells reported by the UE to the location server has been optimized using the QCL information associated with the neighboring cells reported to the UE. Whereas a total of twenty neighboring cells may have been reported by the UE to the location server if all neighboring cells detected by the UE were reported, there are only twelve neighboring cells that may be reported in the example once the set of neighboring cells has been optimized using the QCL relationship information received by the UE. In the example, the selection of subsets of neighboring cells from each set of neighboring cells is based on signal/channel characteristics of the neighboring cells as perceived by the UE. Neighboring cells that meet the signal/channel characteristic criterion are included in the final set of neighboring cells reported to the location server, while neighboring cells that fail to meet the signal/channel characteristic criterion are omitted from the reporting. As a result, fewer neighboring cells are reported to the location server, and the neighboring cells that are reported are selected to provide the best measurements by the UE positioning session.

Additionally, or in the alternative, QCL relationship information may be used by the UE to optimize the measurement of neighboring cells identified in AD received from the location server. In an aspect, the UE employs the QCL relationship information to conduct measurements on selected neighboring cells in an optimal manner within the time period allotted for conducting measurements in a positioning session. In an aspect, the UE conducts measurements of neighboring cells that do not have a QCL relationship with other neighboring cells before conducting measurements of neighboring cells that have a QCL relationship with other neighboring cells. In an aspect, the order in which measurements of neighboring cells having QCL relationships is optimized in a manner in which the time sequence of the neighboring cell measurements are taken to achieve a high degree of geometric and cell characteristic diversity.

Figure 14:
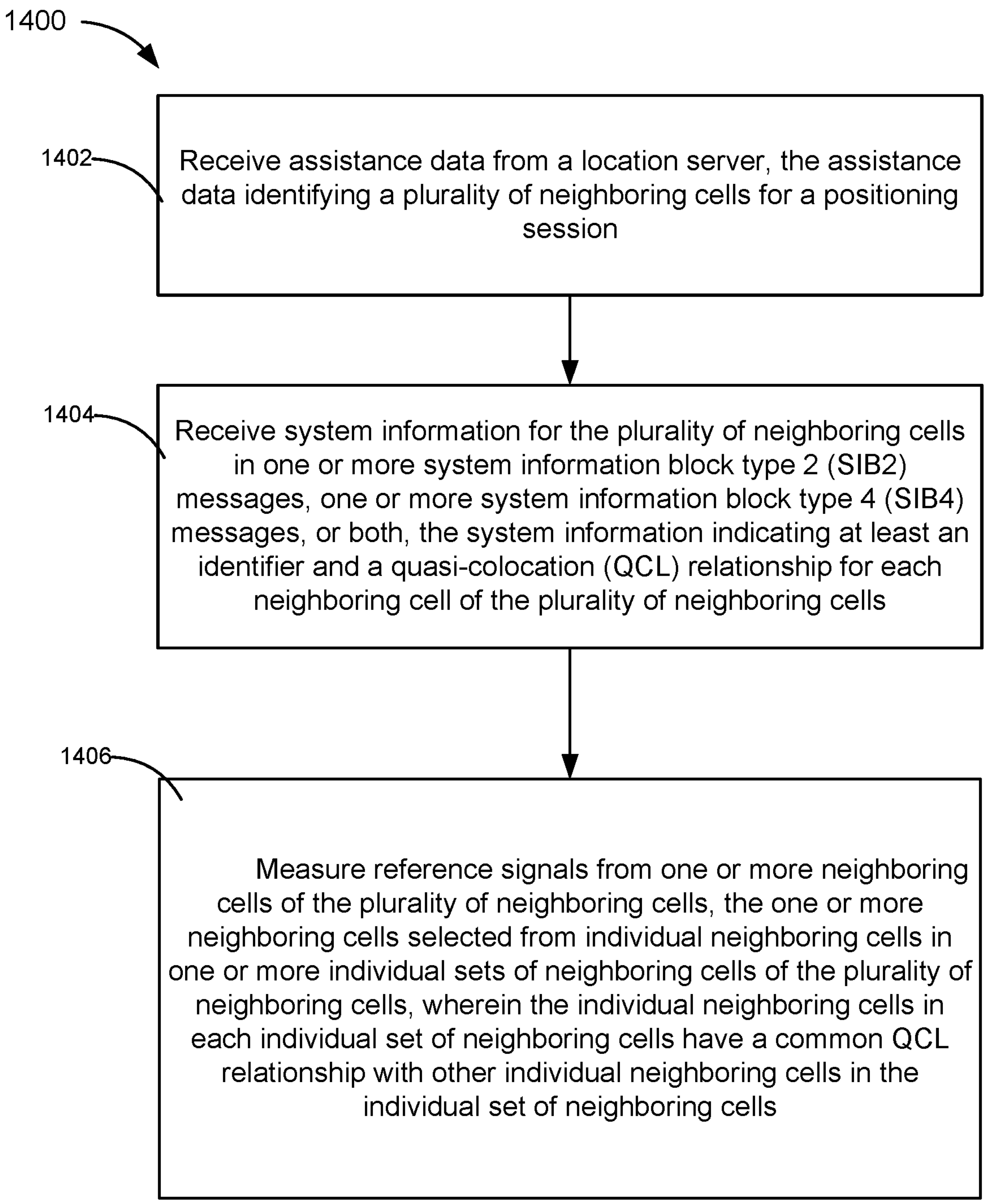
FIG. 14 is a flowchart depicting operations of an example method of wireless communication executed by a UE according to aspects of the disclosure.

FIG. 14 is a flowchart 1400 depicting operations of an example method of wireless communication performed by a UE. In this example, the UE receives assistance data from a location server at operation 1402, the assistance data identifying a plurality of neighboring cells for a positioning session. In an aspect, the AD identifies a plurality of neighboring cells having reference signals (e.g., PRS) that the UE is to measure in the positioning session. In an aspect, the AD includes only neighboring cells from an optimized set of neighboring cells previously reported to the location server by the UE during a positioning session. In another aspect, the AD includes a larger set of neighboring cells that are designated by the location server for reference signal measurements. In an aspect, the AD in the larger set of neighboring cells has not been subject to optimization using QCL relationships between the neighboring cells of the set of neighboring cells. In an aspect, measurements for the neighboring cells identified in the AD of the larger set of neighboring cells may be difficult to execute within the time allotted for reference signal measurements during a positioning session. In an aspect, operation 1402 may be performed by the one or more WWAN transceivers 310, the one or more processors 332, memory 340, and/or positioning component 342, any or all of which may be considered means for performing this operation.

At operation 1404, the UE receives system information for the plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells. In an aspect, operation 1404 may be performed by the one or more WWAN transceivers 310, the one or more processors 332, memory 340, and/or positioning component 342, any or all of which may be considered means for performing this operation.

At operation 1406, the UE measures reference signals from one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells. In an aspect, operation 1406 may be performed by the one or more WWAN transceivers 310, the one or more processors 332, memory 340, and/or positioning component 342, any or all of which may be considered means for performing this operation.

In an aspect, reference signal measurements of one or more neighboring cells of the plurality of neighboring cells at operation 1406 have a lower priority for reference signal measurements than reference signal measurements of neighboring cells that do not have a QCL relationship with any other neighboring cell of the plurality of neighboring cells. In an aspect, reference signal measurements of all of the neighboring cells that do not have a QCL relationship with any other neighboring cell of the plurality of neighboring cells are executed before reference signal measurements or taken at operation 1406. In an aspect, reference signal measurements taken at operation 1406 may be terminated upon expiration of the time allotted for reporting reference signal measurements (e.g., the response time of FIG. 4).

The reference signal measurements may be reported to the location server. In an aspect, reference signal measurements for each of the one or more neighboring cells taken at operation 1406 are queued for reporting by the UE to the location server as each reference signal measurement is completed. In an aspect, the UE may report the queued reference signal measurements to the location server once all reference signal measurements taken at operation 1406 have been measured. Additionally, or in the alternative, the queued reference signal measurements may be reported upon expiration of the time allotted for reporting reference signal measurements during the positioning session.

Figure 15:
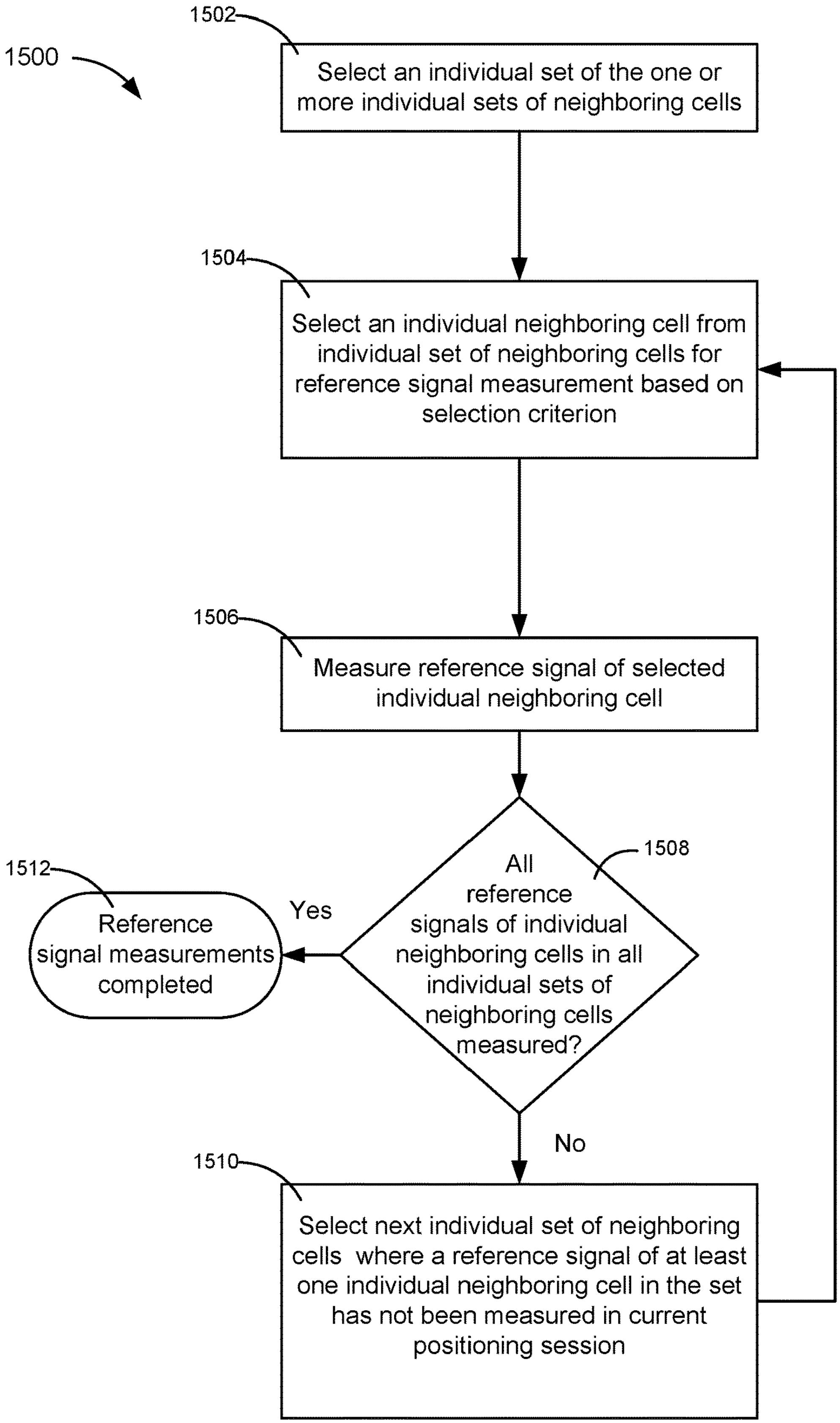
FIG. 15 is a flowchart depicting operations of an example method of wireless communication executed by a UE in conducting measurements of reference signals of neighboring cells included in AD provided to the UE by a location server according to aspects of the disclosure.

FIG. 15 is a flowchart 1500 depicting operations of an example method of wireless communication executed by a UE in conducting measurements of reference signals of neighboring cells included in AD provided to the UE by a location server. The example operations shown in FIG. 15 depict an example of round-robin scheduling of reference signal measurements for neighboring cells in the individual sets of neighboring cells in which the neighboring cells in the individual set have a common QCL relationship with other neighboring cells in the individual set.

At operation 1502 of the example shown in FIG. 15, the UE selects an individual set of the one or more individual sets of neighboring cells. The individual set of neighboring cells that is selected includes at least one individual neighboring cell for which a reference signal in the set has not been measured in a current positioning session.

Each round-robin cycle includes measurement of a reference signal of a reduced subset (e.g., one neighboring cell in the following examples) of neighboring cells selected from each set of neighboring cells. At operation 1504, an individual neighboring cell of the selected individual set is selected for reference signal measurement based on selection criterion. In an aspect, an individual neighboring cell is only subject to selection at operation 1504 if the reference signal for the individual neighboring cell has not yet been measured in the current positioning session. When reference signal measurements have not been taken of two or more individual neighboring cells in the individual set of neighboring cells, the UE may select the individual neighboring cell within the individual set of neighboring cells that best meets any specified criterion for measurement relative to other individual neighboring cells within the individual set of neighboring cells.

Selection of the individual neighboring cell may take place at operation 1504, and a reference signal of the selected individual neighboring cell may be measured at operation 1506. As an example in which RSSI rank is used as a selection criterion, if the individual neighboring cell within the individual set of neighboring cells has the highest RSSI rank of other individual neighboring cells in the individual set that have yet to be measured, the individual neighboring cell may be selected for reference signal measurement at operation 1504 and the reference signal of the individual neighboring cell may be measured at operation 1506. As an example in which geometric diversity is used as a selection criterion, if an individual neighboring cell within the individual set of neighboring cells is the neighboring cell contributing to the best geometric diversity with respect to other individual neighboring cells in the individual set of neighboring cells, the individual neighboring cell may be selected at operation 1504 and measured at operation 1506. In an aspect, operation 1504 and operation 1506 may be performed by the one or more WWAN transceivers 310, the one or more processors 332, memory 340, and/or positioning component 342, any or all of which may be considered means for performing this operation.

At operation 1508, a determination is made as to whether all reference signals of neighboring cells in all sets of neighboring cells have been measured. If there are individual neighboring cells in other individual sets of neighboring cells that have not been measured, the next individual set of neighboring cells in which a reference signal of at least one individual neighboring cell in the individual set has not been measured is selected at operation 1510. After the individual neighboring cell (or a subset of selected individual neighboring cells) within an individual set of neighboring cells has been measured, the individual neighboring cells of the set are no longer under consideration as the next individual set of neighboring cells at operation 1510 until at least one individual neighboring cell has been measured from all other individual sets of neighboring cells. This results in round-robin measurements of neighboring cells, where each cycle of the round-robin measurement cycle involves selecting an eligible individual neighboring cell (e.g., a neighboring cell that has not yet been measured during the positioning session) from each eligible set of neighboring cells (e.g., each individual set of neighboring cells having at least one individual neighboring cell that has not yet been measured during the positioning session). Once all reference signals of the individual neighboring cells in all of the individual sets of neighboring cells have been measured, reference signal measurements are deemed to have been completed at operation 1512. However, the reference signal measurements may also be terminated in response to a timeout ending the duration of time allotted to the UE for conducting measurements of neighboring cells.

In an aspect, operation 1508 and operation 1510 may be performed by the one or more WWAN transceivers 310, the one or more processors 332, memory 340, and/or positioning component 342, any or all of which may be considered means for performing this operation.

FIG. 16 shows a table 1600 depicting an example sequence of ordered neighboring cell measurements that may occur if certain aspects of the operations shown in FIG. 14 and FIG. 15 are applied to the neighboring cells in the sets of neighboring cells shown in FIG. 12. In the example shown in FIG. 16, reference signal measurements are first taken of all neighboring cells that do not have QCL relationships. In the example shown in FIG. 16, reference signal measurements are first taken from PCI4/SSB4, PCI5/SSB5, PCI10/SSB10, PCI11/SSB11, PCI14/SSB14, PCI19/SSB19, and PCI20/SSB20.

Once reference signal measurements for all neighboring cells that do not have QCL relationships have been measured, the UE may then begin round-robin measurements of neighboring cells in the sets of neighboring cells having common QCL relationships. In the example shown in FIG. 16, the UE begins a first round-robin cycle by selecting a neighboring cell from Cell Set 1. The UE selects neighboring cell PCI2/SSB2 from Cell Set 1 for reference signal measurement since neighboring cell PCI2/SSB2 has the highest RSSI rank of the eligible neighboring cells within the set. Next, the UE selects a neighboring cell from Cell Set 2. The UE selects neighboring cell PCI9/SSB9 from Cell Set 2 for reference signal measurement since neighboring cell PCI9/SSB9 has the highest RSSI rank of the eligible neighboring cells within Cell Set 2. Next, the UE selects a neighboring cell from Cell Set 3. The UE selects neighboring cell PCI12/SSB12 from Cell Set 3 for reference signal measurement since neighboring cell PCI12/SSB 12 has the highest RSSI rank of the eligible neighboring cells within Cell Set 3. Next, the UE selects a neighboring cell from Cell Set 4. The UE selects neighboring cell PCI15/SSB15 from Cell Set 4 for reference signal measurement since neighboring cell PCI15/SSB 15 has the highest RSSI rank of the eligible neighboring cells within Cell Set 4.

Next, the UE selects a neighboring cell from Cell Set 5. The UE selects neighboring cell PCI18/SSB18 from Cell Set 5 for reference signal measurement since neighboring cell PCI18/SSB 18 has the highest RSSI rank of the eligible neighboring cells within Cell Set 5. Since all sets of neighboring cells have at least one neighboring cell that has been measured, the first round-robin cycle is completed upon measurement of the reference signal of neighboring cell PCI18/SSB18.

The second round-robin cycle of measurements begins by returning to Cell Set 1. Since a reference signal measurement has already been taken of neighboring cell PCI2/SSB2 in the prior round-robin cycle, only neighboring cell PCI1/SSB1 and neighboring cell PCI/SSB3 are eligible for measurement. The UE selects neighboring cell PCI3/SSB3 from Cell Set 1 for reference signal measurement since neighboring cell PCI3/SSB3 has the highest RSSI rank of the eligible neighboring cells within Cell Set 1.

Next, the UE selects a neighboring cell from Cell Set 2. Only neighboring cell PCI6/SSB6, PCI7/SSB7, and PCI8/SSB8 are eligible for measurement since neighboring cell PCI9/SSB9 has already been measured. The UE selects neighboring cell PCI6/SSB6 from Cell Set 2 for reference signal measurement since neighboring cell PCI6/SSB6 has the highest RSSI rank of the eligible neighboring cells within Cell Set 2. Next, the UE selects a neighboring cell from Cell Set 3. The UE selects neighboring cell PCI13/SSB13 from Cell Set 3 for reference signal measurement since neighboring cell PCI12/SSB 12 is the only eligible neighboring cell for measurement within Cell Set 3.

Next, the UE measures the reference signal of neighboring cell PCI16/SSB16 from Cell Set 4 since neighboring cell PCI16/SSB16 is the only eligible neighboring cell within Cell Set 4. The UE then measures the reference signal of neighboring cell PCI17/SSB17 of Cell Set 5 thereby completing the second cycle of round-robin measurements.

In the third cycle of round-robin measurements, Cell Set 3, Cell Set 4, and Cell Set 5 are no longer eligible neighboring cell sets since all neighboring cells in each such set have been measured. Accordingly, the UE proceeds with the third cycle of round-robin measurements by measuring the reference signal of PCI1/SSB1, the only remaining eligible neighboring cell in Cell Set 1. Next, the UE measures neighboring cell PCI8/SSB8 of Cell Set 2 since neighboring cell PCI8/SSB8 has the highest RSSI rank of the neighboring cells in Cell Set 2. With the measurement of neighboring cell PCI8/SSB8, the third round of round-robin measurements is completed.

Since there is still a neighboring cell that has not yet been measured, the UE undertakes a fourth cycle of round-robin measurements. In this fourth cycle, only Cell Set 2 has a neighboring cell that is eligible for measurement. Accordingly, the fourth cycle starts and ends with a reference signal measurement of neighboring cell PCI9/SSB9. Since there are no more eligible neighboring cells for measurement after measurement of neighboring cell PCI9/SSB9, the measurement of neighboring cells in the AD is deemed complete.

Additionally, or in the alternative, optimized selection of neighboring cells for AD may take place at the location server based on QCL information provided by the NG-RAN. In an aspect, information for neighboring cells is communicated from the NG-RAN to the location server using, for example, NR Positioning Protocol A (NRPPa). NRPPa location information transfer procedures are used to handle the transfer of positioning-related information between NG-RAN Nodes and a location server (e.g., LMF 270). Selection of neighboring cells by the location server using QCL relationships based on QCL information contemplates an extension of NRPPa in which the NG-RAN provides QCL information for neighboring cells to the location server. In an aspect, the NRPPa may be extended to include QCL information such as found in SIB2 and SIB4.

The location server can use the optimized selection of neighboring cells to articulate the AD without reference to neighboring cells reported by the UE. The location server can use the QCL information across cells and beams to provide measurement object lists that are not quasi-colocated thereby providing an object list that provides better geometry (e.g., GDOP).

FIG. 17 is a flowchart 1700 depicting operations of an example method of wireless communication performed by a location server. In this example, at operation 1702, the location server receives system information for a plurality of neighboring cells, the system information indicating at least an identifier and a QCL relationship for each neighboring cell of the plurality of neighboring cells. At operation 1704, the location server selects a subset of neighboring cells from each individual set of one or more individual sets of neighboring cells for providing first assistance data to a UE, wherein the individual neighboring cells in each individual set of neighboring cells have a common QCL relationship with other individual neighboring cells in the individual set of neighboring cells, the subset of neighboring cells having fewer individual neighboring cells than the individual set of neighboring cells from which the subset of neighboring cells is selected. At operation 1706, the location server transmits the first assistance data to the UE, the first assistance data including identifiers of one or more of the individual neighboring cells in each subset of neighboring cells. In an aspect, the identifiers transmitted by the location server at operation 1706 only include identifiers for individual neighboring cells that the location server determines are detectable by the UE. In an aspect, operations 1702, 1704, and 1706 may be performed by the one or more network transceivers 390, the one or more processors 394, memory 396, and/or positioning component 398, any or all of which may be considered means for performing this operation.

An example environment in which optimized selection of neighboring cells by a location server may take place is shown in FIG. 11. If the location server selects neighboring cells in the same manner as discussed herein with respect to the UE optimization of reported neighboring cells, the neighboring cells transmitted to the UE for AD are the neighboring cells shown in table 1800 of FIG. 18. This allows the location server to not rely entirely on crowd-sourcing information for improving GDOP, but allows the location server to provide information that is closer to real-time.

As will be appreciated, there are various technical advantages to using QCL relationships of neighboring cells in the selection of neighboring cells by a UE for reporting to a location server. Such technical advantages include a reduction in the amount of data exchanged between the UE and a location server during a positioning session. Technical advantages also include an optimized selection of neighboring cells for reporting by a UE based on geometric diversity of the neighboring cells, the strength of reference signals received by the UE from the neighboring cells, etc. Further technical advantages include a decreased time needed for UE measurement of neighboring cells of an optimized set while still maintaining the geometric diversity of the neighboring cells in the optimized set. Another further technical advantage includes reducing the amount of time that the UE needs to complete the measurement of all inter-frequency cells during measurement gaps. Still further technical advantages include identifying an optimized set of neighboring cells for transmission by a location server to a UE during a positioning session.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and reporting, to a location server, identifiers of one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

Clause 2. The method of clause 1, further comprising: reporting a subset of the individual neighboring cells from each of the individual sets of neighboring cells to the location server, the subset of the individual neighboring cells having fewer individual neighboring cells than the individual set of neighboring cells from which the subset of the individual neighboring cells is selected.

Clause 3. The method of clause 2, wherein: the subset of the individual neighboring cells includes only one neighboring cell.

Clause 4. The method of any of clauses 1 to 3, further comprising: reporting, to the location server, identifiers of one or more neighboring cells that do not have a QCL relationship with any other neighboring cell of the plurality of neighboring cells.

Clause 5. The method of clause 4, wherein: the identifiers of the one or more neighboring cells that do not have a QCL relationship with any other neighboring cell of the plurality of neighboring cells are reported before identifiers of the individual neighboring cells of the one or more individual sets of neighboring cells.

Clause 6. The method of any of clauses 1 to 5, wherein: the identifiers of the one or more neighboring cells of the plurality of neighboring cells are reported to the location server as part of obtaining an initial fix on a location of the UE during a positioning session.

Clause 7. The method of any of clauses 1 to 6, wherein: the identifiers of the one or more neighboring cells of the plurality of neighboring cells are reported to the location server based on being inter-frequency to the UE.

Clause 8. The method of any of clauses 1 to 7, wherein: the identifiers of the one or more neighboring cells of the plurality of neighboring cells reported to the location server includes only neighboring cells having a common QCL type.

Clause 9. A method of wireless communication performed by a user equipment (UE), comprising: receiving assistance data from a location server, the assistance data identifying a plurality of neighboring cells for a positioning session; receiving system information for the plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and measuring reference signals from one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

Clause 10. The method of clause 9, further comprising: measuring reference signals of one or more neighboring cells that do not have a QCL relationship with any other neighboring cell of the plurality of neighboring cells before measuring reference signals from the individual neighboring cells of the one or more individual sets of neighboring cells.

Clause 11. The method of any of clauses 9 to 10, further comprising: performing round-robin scheduled measurements of reference signals from the individual neighboring cells in the one or more individual sets of neighboring cells.

Clause 12. The method of clause 11, wherein: only reference signal(s) for a single neighboring cell from each individual set of the one or more individual sets of neighboring cells is measured during each round-robin cycle.

Clause 13. A method of operating a location server (LS), comprising: receiving system information for a plurality of neighboring cells, the system information indicating at least an identifier and a quasi-colocation (QCL) relation for each neighboring cell of the plurality of neighboring cells; and selecting a subset of neighboring cells from each individual set of one or more individual sets of neighboring cells for providing first assistance data to a UE, wherein the individual neighboring cells in each individual set of neighboring cells have a common QCL relationship with other individual neighboring cells in the individual set of neighboring cells, the subset of neighboring cells having fewer individual neighboring cells than the individual set of neighboring cells from which the subset of neighboring cells is selected; and transmitting the first assistance data to the UE, the first assistance data including identifiers of one or more of the individual neighboring cells in each subset of neighboring cells.

Clause 14. The method of clause 13, further comprising: transmitting, to the UE, second assistance data for neighboring cells that do not have a QCL relationship with any other neighboring cell of the plurality of neighboring cells.

Clause 15. A user equipment (UE), comprising: a memory; at least one transceiver; and at least one processor communicatively coupled to the memory and the at least one transceiver, the at least one processor configured to: receive, via the at least one transceiver, system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and report, to a location server via the at least one transceiver, identifiers of one or more neighboring cells of the plurality of neighboring cells, the one or more neighboring cells selected from individual neighboring cells of one or more individual sets of neighboring cells of the plurality of neighboring cells, wherein each individual neighboring cell in each individual set of neighboring cells have a common QCL relationship with other individual neighboring cells in the individual set of neighboring cells.

Clause 16. The UE of clause 15, wherein the at least one processor is further configured to: report a subset of the individual neighboring cells from each of the individual sets of neighboring cells to the location server, the subset of the individual neighboring cells having fewer individual neighboring cells than the individual set of neighboring cells from which the subset of the individual neighboring cells is selected.

Clause 17. The UE of clause 16, wherein: the subset of the individual neighboring cells includes only one neighboring cell.

Clause 18. The UE of any of clauses 15 to 17, wherein the at least one processor is further configured to: report, to the location server via the at least one transceiver, identifiers of one or more neighboring cells that do not have a QCL relationship with any other neighboring cell of the plurality of neighboring cells.

Clause 19. The UE of clause 18, wherein: the identifiers of the one or more neighboring cells that do not have a QCL relationship with any other neighboring cell of the plurality of neighboring cells are reported before the identifiers of the individual neighboring cells that are selected from the one or more individual sets of neighboring cells.

Clause 20. The UE of any of clauses 15 to 19, wherein: the identifiers of the one or more neighboring cells of the plurality of neighboring cells are reported to the location server as part of obtaining an initial fix on a location of the UE during a positioning session.

Clause 21. The UE of any of clauses 15 to 20, wherein: the identifiers of the one or more neighboring cells of the plurality of neighboring cells are reported to the location server based on being inter-frequency to the UE.

Clause 22. The UE of any of clauses 15 to 21, wherein: the identifiers of the one or more neighboring cells of the plurality of neighboring cells reported to the location server includes only neighboring cells having a common QCL type.

Clause 23. A user equipment (UE), comprising: a memory; at least one transceiver; and at least one processor communicatively coupled to the memory and the at least one transceiver, the at least one processor configured to: receive, via the at least one transceiver, assistance data from a location server, the assistance data identifying a plurality of neighboring cells for a positioning session; receive, via the at least one transceiver, system information for the plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and measure, via the at least one transceiver, reference signals from one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

Clause 24. The UE of clause 23, wherein the at least one processor is further configured to: measure, via the at least one transceiver, reference signals of one or more neighboring cells that do not have a QCL relationship with any other neighboring cell of the plurality of neighboring cells before measuring reference signals from the individual neighboring cells of the one or more individual sets of neighboring cells.

Clause 25. The UE of any of clauses 23 to 24, wherein the at least one processor is further configured to: perform round-robin scheduled measurements of reference signals from the individual neighboring cells in the one or more individual sets of neighboring cells of the plurality of neighboring cells.

Clause 26. The UE of clause 25, wherein: only reference signal(s) for a single neighboring cell from each of the one or more individual sets of neighboring cells is measured during each round-robin cycle.

Clause 27. A location server, comprising: a memory; at least one transceiver; and at least one processor communicatively coupled to the memory and the at least one transceiver, the at least one processor configured to: receive, via the at least one transceiver, system information for a plurality of neighboring cells, the system information indicating at least an identifier and a quasi-colocation (QCL) relation for each neighboring cell of the plurality of neighboring cells; and select a subset of neighboring cells from each individual set of one or more individual sets of neighboring cells for providing first assistance data to a user equipment (UE), wherein the individual neighboring cells in each individual set of neighboring cells have a common QCL relationship with other neighboring cells in the individual set of neighboring cells, the subset of neighboring cells having fewer neighboring cells than the individual set of the one or more neighboring cells from which the subset of neighboring cells is selected; and transmit, via the at least one transceiver, the first assistance data to the UE, the first assistance data including identifiers of one or more of the individual neighboring cells in each subset of neighboring cells.

Clause 28. The location server of clause 27, wherein the at least one processor is further configured to: transmit, via the at least one transceiver, to the UE, second assistance data for neighboring cells that do not have a QCL relationship with any other neighboring cell of the plurality of neighboring cells.

Clause 29. A user equipment (UE), comprising: means for receiving system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and means for reporting, to a location server, identifiers of one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

Clause 30. The UE of clause 29, further comprising: means for reporting a subset of the individual neighboring cells from each individual set of neighboring cells to the location server, the subset of the individual neighboring cells having fewer individual neighboring cells than the individual set of neighboring cells from which the subset of the individual neighboring cells is selected.

Clause 31. The UE of clause 30, wherein: the subset of the individual neighboring cells includes only one neighboring cell.

Clause 32. The UE of any of clauses 29 to 31, further comprising: means for reporting, to the location server, identifiers of one or more neighboring cells that do not have a QCL relationship with any other neighboring cell of the plurality of neighboring cells.

Clause 33. The UE of clause 32, wherein: the identifiers of the one or more neighboring cells that do not have a QCL relationship with any other neighboring cell of the plurality of neighboring cells are reported before identifiers of the individual neighboring cells of the one or more individual sets of neighboring cells.

Clause 34. The UE of any of clauses 29 to 33, wherein: the identifiers of the one or more neighboring cells of the plurality of neighboring cells are reported to the location server as part of obtaining an initial fix on a location of the UE during a positioning session.

Clause 35. The UE of any of clauses 29 to 34, wherein: the identifiers of the one or more neighboring cells of the plurality of neighboring cells are reported to the location server based on being inter-frequency to the UE.

Clause 36. The UE of any of clauses 29 to 35, wherein: the identifiers of the one or more neighboring cells of the plurality of neighboring cells reported to the location server includes only neighboring cells having a common QCL type.

Clause 37. A user equipment (UE), comprising: means for receiving assistance data from a location server, the assistance data identifying a plurality of neighboring cells for a positioning session; means for receiving system information for the plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and means for measuring reference signals from one or more neighboring cells of the plurality of neighboring cells, the one or more neighboring cells selected from individual neighboring cells of one or more individual sets of neighboring cells of the plurality of neighboring cells, wherein individual neighboring cells in each individual set of neighboring cells have a common QCL relationship with other individual neighboring cells in the individual set of neighboring cells.

Clause 38. The UE of clause 37, further comprising: means for measuring reference signals of one or more neighboring cells that do not have a QCL relationship with any other neighboring cell of the plurality of neighboring cells before measuring reference signals from neighboring cells of individual sets of one or more neighboring cells having a QCL relationship.

Clause 39. The UE of any of clauses 37 to 38, further comprising: means for performing round-robin scheduled measurements of reference signals from the individual neighboring cells in the one or more individual sets of neighboring cells.

Clause 40. The UE of clause 39, wherein: the means for performing round-robin scheduled measurements only measures referencing signal(s) for a single individual neighboring cell from each of the one or more individual sets of neighboring cells during each round-robin cycle.

Clause 41. A location server, comprising: means for receiving system information for a plurality of neighboring cells, the system information indicating at least an identifier and a quasi-colocation (QCL) relation for each neighboring cell of the plurality of neighboring cells; and means for selecting a subset of neighboring cells from each individual set of one or more individual sets of neighboring cells for providing first assistance data to a user equipment (UE), wherein the individual neighboring cells in each individual set of neighboring cells have a common QCL relationship with other individual neighboring cells in the individual set of neighboring cells, the subset of neighboring cells having fewer individual neighboring cells than the individual set of neighboring cells from which the subset of neighboring cells is selected; and means for transmitting the first assistance data to the UE, the assistance data including identifiers of one or more of the individual neighboring cells in each subset of neighboring cells.

Clause 42. The location server of clause 41, further comprising: means for transmitting, to the UE, second assistance data for neighboring cells that do not have a QCL relationship with any other neighboring cell of the plurality of neighboring cells.

Clause 43. A non-transitory computer-readable medium storing computer-executable instructions that, when executed by a user equipment (UE), cause the UE to: receive system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and report, to a location server, identifiers of one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells.

Clause 44. The non-transitory computer-readable medium of clause 43, further comprising computer-executable instructions that, when executed by the UE, cause the UE to: report a subset of the individual neighboring cells from each of the individual sets of neighboring cells to the location server, the subset of the individual neighboring cells having fewer individual neighboring cells than the individual set of neighboring cells from which the subset of the individual neighboring cells is selected.

Clause 45. The non-transitory computer-readable medium of clause 44, wherein: the subset of the individual neighboring cells includes only one neighboring cell.

Clause 46. The non-transitory computer-readable medium of any of clauses 43 to 45, further comprising computer-executable instructions that, when executed by the UE, cause the UE to: report, to the location server, identifiers of neighboring cells that do not have a QCL relationship with any other neighboring cell of the plurality of neighboring cells.

Clause 47. The non-transitory computer-readable medium of clause 46, wherein: the identifiers of neighboring cells that do not have a QCL relationship with any other neighboring cell of the plurality of neighboring cells are reported before identifiers of the individual neighboring cells of the one or more individual sets of neighboring cells.

Clause 48. The non-transitory computer-readable medium of any of clauses 43 to 47, wherein: the identifiers of the one or more neighboring cells of the plurality of neighboring cells are reported to the location server as part of obtaining an initial fix on a location of the UE during a positioning session.

Clause 49. The non-transitory computer-readable medium of any of clauses 43 to 48, wherein: the identifiers of the one or more neighboring cells of the plurality of neighboring cells are reported to the location server based on being inter-frequency to the UE.

Clause 50. The non-transitory computer-readable medium of any of clauses 43 to 49, wherein: the identifiers of the one or more neighboring cells of the plurality of neighboring cells reported to the location server includes only neighboring cells having a common QCL type.

Clause 51. A non-transitory computer-readable medium storing computer-executable instructions that, when executed by a user equipment (UE), cause the UE to: receive assistance data from a location server, the assistance data identifying a plurality of neighboring cells for a positioning session; receive system information for the plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and measure reference signals from one or more neighboring cells of the plurality of neighboring cells, the one or more neighboring cells selected from individual neighboring cells of one or more individual sets of neighboring cells of the plurality of neighboring cells, wherein individual neighboring cells in each individual set of each of neighboring cells have a common QCL relationship with other individual neighboring cells in the individual set of neighboring cells.

Clause 52. The non-transitory computer-readable medium of clause 51, further comprising computer-executable instructions that, when executed by the UE, cause the UE to: measure reference signals of one or more neighboring cells that do not have a QCL relationship with any other neighboring cell of the plurality of neighboring cells before measuring reference signals from the individual neighboring cells of the one or more individual sets of neighboring cells.

Clause 53. The non-transitory computer-readable medium of any of clauses 51 to 52, further comprising computer-executable instructions that, when executed by the UE, cause the UE to: perform round-robin scheduled measurements of reference signals from the individual neighboring cells in the one or more individual sets of neighboring cells.

Clause 54. The non-transitory computer-readable medium of clause 53, wherein: only reference signal(s) for a single neighboring cell from each individual set of the one or more individual sets of neighboring cells is measured during each round-robin cycle.

Clause 55. A non-transitory computer-readable medium storing computer-executable instructions that, when executed by a location server, cause the location server to: receive system information for a plurality of neighboring cells, the system information indicating at least an identifier and a quasi-colocation (QCL) relation for each neighboring cell of the plurality of neighboring cells; and select a subset of neighboring cells from each individual set of one or more individual sets of neighboring cells for providing first assistance data to a user equipment (UE), wherein individual neighboring cells in each individual set neighboring cells have a common QCL relationship with other individual neighboring cells in the individual set of neighboring cells, the subset of neighboring cells having fewer individual neighboring cells than the individual set of neighboring cells from which the subset of neighboring cells is selected; and transmit the first assistance data to the UE, the first assistance data including identifiers of one or more of the individual neighboring cells in each subset of neighboring cells.

Clause 56. The non-transitory computer-readable medium of clause 55, further comprising computer-executable instructions that, when executed by the location server, cause the location server to: transmit, to the UE, second assistance data for neighboring cells that do not have a QCL relationship with any other neighboring cell of the plurality of neighboring cells.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:

receiving system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and reporting, to a location server, identifiers of one or more neighboring cells of the plurality of neighboring cells, the one or more neighboring cells selected from individual neighboring cells of one or more individual sets of neighboring cells of the plurality of neighboring cells, wherein the individual neighboring cells in each individual set of neighboring cells have a common QCL relationship with other individual neighboring cells in the individual set of neighboring cells, wherein the reporting is based on the QCL relationships indicated by the received system information.

2. The method of claim 1, further comprising:

reporting a subset of the individual neighboring cells from each of the individual sets of neighboring cells to the location server, the subset of the individual neighboring cells having fewer individual neighboring cells than the individual set of neighboring cells from which the subset of the individual neighboring cells is selected.

3. The method of claim 2, wherein:

the subset of the individual neighboring cells includes only one neighboring cell.

4. The method of claim 1, further comprising:

reporting, to the location server, identifiers of one or more neighboring cells that do not have a QCL relationship with any other neighboring cell of the plurality of neighboring cells.

5. The method of claim 4, wherein:

the identifiers of the one or more neighboring cells that do not have a QCL relationship with any other neighboring cell of the plurality of neighboring cells are reported before identifiers of the individual neighboring cells of the one or more individual sets of neighboring cells.

6. The method of claim 1, wherein:

the identifiers of the one or more neighboring cells of the plurality of neighboring cells are reported to the location server as part of obtaining an initial fix on a location of the UE during a positioning session.

7. The method of claim 1, wherein:

the identifiers of the one or more neighboring cells of the plurality of neighboring cells are reported to the location server based on being inter-frequency to the UE.

8. The method of claim 1, wherein:

the identifiers of the one or more neighboring cells of the plurality of neighboring cells reported to the location server includes only neighboring cells having a common QCL type.

9. A method of operating a location server (LS), comprising:

receiving system information for a plurality of neighboring cells, the system information indicating at least an identifier and a quasi-colocation (QCL) relation for each neighboring cell of the plurality of neighboring cells; and selecting a subset of neighboring cells from each individual set of one or more individual sets of neighboring cells for providing first assistance data to a UE, wherein the individual neighboring cells in each individual set of neighboring cells have a common QCL relationship with other individual neighboring cells in the individual set of neighboring cells, the subset of neighboring cells having fewer individual neighboring cells than the individual set of neighboring cells from which the subset of neighboring cells is selected; and transmitting the first assistance data to the UE, the first assistance data including identifiers of one or more of the individual neighboring cells in each subset of neighboring cells.

10. The method of claim 9, further comprising:

transmitting, to the UE, second assistance data for neighboring cells that do not have a QCL relationship with any other neighboring cell of the plurality of neighboring cells.

11. A user equipment (UE), comprising:

a memory;

at least one transceiver; and at least one processor communicatively coupled to the memory and the at least one transceiver, the at least one processor configured to:

receive, via the at least one transceiver, system information for a plurality of neighboring cells in one or more system information block type 2 (SIB2) messages, one or more system information block type 4 (SIB4) messages, or both, the system information indicating at least an identifier and a quasi-colocation (QCL) relationship for each neighboring cell of the plurality of neighboring cells; and report, to a location server via the at least one transceiver, identifiers of one or more neighboring cells of the plurality of neighboring cells, the one or more neighboring cells selected from individual neighboring cells of one or more individual sets of neighboring cells of the plurality of neighboring cells, wherein each individual neighboring cell in each individual set of neighboring cells have a common QCL relationship with other individual neighboring cells in the individual set of neighboring cells, wherein the report is based on the QCL relationships indicated by the received system information.

12. The UE of claim 11, wherein the at least one processor is further configured to:

report a subset of the individual neighboring cells from each of the individual sets of neighboring cells to the location server, the subset of the individual neighboring cells having fewer individual neighboring cells than the individual set of neighboring cells from which the subset of the individual neighboring cells is selected.

13. The UE of claim 12, wherein:

the subset of the individual neighboring cells includes only one neighboring cell.

14. The UE of claim 11, wherein the at least one processor is further configured to:

report, to the location server via the at least one transceiver, identifiers of one or more neighboring cells that do not have a QCL relationship with any other neighboring cell of the plurality of neighboring cells.

15. The UE of claim 14, wherein:

the identifiers of the one or more neighboring cells that do not have a QCL relationship with any other neighboring cell of the plurality of neighboring cells are reported before the identifiers of the individual neighboring cells that are selected from the one or more individual sets of neighboring cells.

16. The UE of claim 11, wherein:

the identifiers of the one or more neighboring cells of the plurality of neighboring cells are reported to the location server as part of obtaining an initial fix on a location of the UE during a positioning session.

17. The UE of claim 11, wherein:

the identifiers of the one or more neighboring cells of the plurality of neighboring cells are reported to the location server based on being inter-frequency to the UE.

18. The UE of claim 11, wherein:

the identifiers of the one or more neighboring cells of the plurality of neighboring cells reported to the location server includes only neighboring cells having a common QCL type.

19. A location server, comprising:

a memory;

at least one transceiver; and at least one processor communicatively coupled to the memory and the at least one transceiver, the at least one processor configured to:

receive, via the at least one transceiver, system information for a plurality of neighboring cells, the system information indicating at least an identifier and a quasi-colocation (QCL) relation for each neighboring cell of the plurality of neighboring cells; and select a subset of neighboring cells from each individual set of one or more individual sets of neighboring cells for providing first assistance data to a user equipment (UE), wherein the individual neighboring cells in each individual set of neighboring cells have a common QCL relationship with other neighboring cells in the individual set of neighboring cells, the subset of neighboring cells having fewer neighboring cells than the individual set of the one or more neighboring cells from which the subset of neighboring cells is selected; and transmit, via the at least one transceiver, the first assistance data to the UE, the first assistance data including identifiers of one or more of the individual neighboring cells in each subset of neighboring cells.

20. The location server of claim 19, wherein the at least one processor is further configured to:

transmit, via the at least one transceiver, to the UE, second assistance data for neighboring cells that do not have a QCL relationship with any other neighboring cell of the plurality of neighboring cells.

* * * * *